United States Patent
Agetsuma et al.

(10) Patent No.: US 10,983,720 B2
(45) Date of Patent: Apr. 20, 2021

(54) SYSTEM FOR CONVERTING DATA PROTECTION LEVELS OF STORAGE NODES

(71) Applicant: Hitachi, Ltd., Tokyo (JP)

(72) Inventors: Masakuni Agetsuma, Tokyo (JP); Takahiro Yamamoto, Tokyo (JP); Hideo Saito, Tokyo (JP); Takaki Nakamura, Tokyo (JP); Takeru Chiba, Tokyo (JP); Hiroto Ebara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/568,543

(22) Filed: Sep. 12, 2019

(65) Prior Publication Data

US 2020/0174672 A1     Jun. 4, 2020

(30) Foreign Application Priority Data

Nov. 30, 2018 (JP) .............................. JP2018-226116

(51) Int. Cl.
*G06F 3/06* (2006.01)
*G06F 12/02* (2006.01)

(52) U.S. Cl.
CPC ............ *G06F 3/065* (2013.01); *G06F 3/0605* (2013.01); *G06F 3/0608* (2013.01); *G06F 3/0644* (2013.01); *G06F 3/0683* (2013.01); *G06F 12/0223* (2013.01)

(58) Field of Classification Search
CPC .... G06F 3/0605; G06F 3/0608; G06F 3/0634; G06F 3/0644; G06F 3/065; G06F 3/067; G06F 3/0683; G06F 12/0223
See application file for complete search history.

(56) References Cited

U.S. PATENT DOCUMENTS

| 2006/0224844 | A1  | 10/2006 | Kano et al. |
| 2007/0189153 | A1* | 8/2007  | Mason ................ G06F 21/6209 370/216 |
| 2015/0121131 | A1  | 4/2015  | Kiselev et al. |

FOREIGN PATENT DOCUMENTS

| JP | 2006-277723 A | 10/2006 |
| JP | 2016-534471 A | 11/2016 |

OTHER PUBLICATIONS

Office Action dated Dec. 22, 2020 for Japanese Application No. 2018-226116 (English translation attached).

\* cited by examiner

*Primary Examiner* — Larry T MacKall
(74) *Attorney, Agent, or Firm* — Baker Botts L.L.P.

(57) ABSTRACT

A storage system is configured to include a plurality of storage nodes, and includes a selection unit which selects a storage node required for setting a data protection level after conversion from among the plurality of storage nodes on the basis of information related to the conversion of the data protection level. The storage node selected by the selection unit manages data using the data protection level after conversion.

7 Claims, 22 Drawing Sheets

FIG. 4

| STORAGE NODE ID 401 | STATE 402 | DOMAIN ID 403 | CAPACITY 404 | USE CAPACITY 405 | CPU LOAD (%) 406 | MEMORY AMOUNT 407 | USE MEMORY AMOUNT 408 | COMMUNICATION BAND 409 | USE COMMUNICATION BAND 410 |
|---|---|---|---|---|---|---|---|---|---|
| 1 | NORMAL | 1 | 100TB | 20TB | 30% | 128GB | 64GB | 10Gbps | 5Gbps |
| 2 | NORMAL | 1 | | | | | | | |
| 3 | NORMAL | 1 | | | | | | | |
| 4 | NORMAL | 1 | | | | | | | |
| 5 | NORMAL | 1 | | | | | | | |
| 6 | NORMAL | 1 | | | | | | | |
| 7 | NORMAL | 1 | | | | | | | |
| 8 | FAILURE | 1 | | | | | | | |
| 9 | NORMAL | 1 | | | | | | | |
| 10 | NORMAL | 1 | | | | | | | |
| 11 | NORMAL | 2 | | | | | | | |
| 12 | NORMAL | 2 | | | | | | | |
| 13 | NORMAL | 2 | | | | | | | |
| 14 | NORMAL | 2 | | | | | | | |
| 15 | NORMAL | 2 | | | | | | | |
| 16 | NORMAL | 2 | | | | | | | |

CHUNK GROUP MANAGEMENT TABLE 510

| CHUNK GROUP ID (511) | STATE (512) | DATA PROTECTION LEVEL (513) | EFFECTIVE CAPACITY (514) |
|---|---|---|---|
| 1 | NORMAL | Mirror | 100GB |
| 2 | NORMAL | EC 4D1P | 400GB |
| 3 | 1 REBUILD | EC 8D2P | 800GB |
| ... | ... | ... | ... |

PHYSICAL REGION MANAGEMENT TABLE OF CHUNK GROUP ID "1" 520A

| STORAGE NODE ID (521A) | DRIVE ID (522A) | PHYSICAL CHUNK ID (523A) | PHYSICAL CAPACITY (524A) | STATE (525A) |
|---|---|---|---|---|
| 1 | 3 | 5 | 100GB | NORMAL |
| 2 | 5 | 8 | 100GB | NORMAL |

PHYSICAL REGION MANAGEMENT TABLE OF CHUNK GROUP ID "2" 520B

| STORAGE NODE ID (521B) | DRIVE ID (522B) | PHYSICAL CHUNK ID (523B) | PHYSICAL CAPACITY (524B) | STATE (525B) |
|---|---|---|---|---|
| 1 | 1 | 4 | 100GB | NORMAL |
| 2 | 4 | 3 | 100GB | NORMAL |
| 3 | 2 | 1 | 100GB | NORMAL |
| 4 | 5 | 3 | 100GB | NORMAL |
| 5 | 1 | 1 | 100GB | NORMAL |

PHYSICAL REGION MANAGEMENT TABLE OF CHUNK GROUP ID "3" 520C

| STORAGE NODE ID (521C) | DRIVE ID (522C) | PHYSICAL CHUNK ID (523C) | PHYSICAL CAPACITY (524C) | STATE (525C) |
|---|---|---|---|---|
| 1 | 2 | 2 | 100GB | NORMAL |
| 2 | 1 | 5 | 100GB | NORMAL |
| 3 | 4 | 3 | 100GB | NORMAL |
| 4 | 6 | 2 | 100GB | NORMAL |
| 5 | 3 | 5 | 100GB | NORMAL |
| 6 | 2 | 1 | 100GB | NORMAL |
| 7 | 1 | 2 | 100GB | NORMAL |
| 8 | 4 | 3 | 100GB | FAILURE |
| 9 | 4 | 4 | 100GB | NORMAL |
| 10 | 1 | 1 | 100GB | NORMAL |

VOLUME MANAGEMENT TABLE OF POOL ID "1" OF STORAGE NODE ID "1" — 1000A

| VOLUME ID | CAPACITY | USE CAPACITY |
|---|---|---|
| 5 | 10GB | 5GB |
| 7 | 50GB | 20GB |
| 12 | 20GB | 12GB |

VOLUME MANAGEMENT TABLE OF POOL ID "2" OF STORAGE NODE ID "1" — 1000B

| VOLUME ID | CAPACITY | USE CAPACITY |
|---|---|---|
| 20 | 10GB | 3GB |
| 22 | 20GB | 4GB |

SYSTEM FOR CONVERTING DATA PROTECTION LEVELS OF STORAGE NODES

BACKGROUND OF THE INVENTION

1. Field of the Invention

The present invention relates to a storage system, and is suitably applied to, for example, a storage system which is configured to include a plurality of storage nodes.

2. Description of the Related Art

In recent years, an SDS (Software Defined Storage) has been developed. An SDS system provides a data protecting function for a plurality of storage nodes. According to such a configuration, for example, even if a failure occurs in one storage node, the system can be continuously operated using the remaining storage nodes.

In addition, in the SDS system, a data protection level of data (for example, volume) provided by the system may be expanded, or the storage nodes may be increased or decreased. In accordance with such a change, the SDS system is required to convert the data protection level to change the using data protection level to an expanded data protection level, or to a more-efficient data protection level.

Therefore, there is disclosed a technique of converting the data protection level by performing a volume migration in which pools of different data protection levels are provided in the storage node, and data of a volume of a first pool is migrated to a volume of another second pool (see JP 2006-277723 A).

SUMMARY OF THE INVENTION

However, in the volume migration in a single storage node as disclosed in JP 2006-277723 A, the data protection level cannot be converted over the plurality of storage nodes.

The invention has been made in view of the above problem, and an object thereof is to provide a storage system which can realize the conversion of the data protection level over the plurality of storage nodes.

In the invention to solve the problem, a storage system which is configured to include a plurality of storage nodes includes a selection unit which selects a storage node required for setting a data protection level after conversion from among the plurality of storage nodes on the basis of information related to the conversion of the data protection level. The storage node selected by the selection unit manages data using the data protection level after conversion.

According to this configuration, the storage node required for the configuration of the data protection level after conversion is selected, and a command is issued to the selected storage node to manage data at the data protection level after conversion. Therefore, the conversion of the data protection level can be performed over the plurality of storage nodes.

According to the invention, it is possible to realize a storage system which can realize the conversion of the data protection level over the plurality of storage nodes.

BRIEF DESCRIPTION OF THE DRAWINGS

FIG. 4 is a diagram illustrating an example of a storage node management table according to the first embodiment;

FIG. 5 is a diagram illustrating an example of a chunk group management table group according to the first embodiment;

FIG. 10 is a diagram illustrating an example of a volume management table group according to the first embodiment;

DESCRIPTION OF THE PREFERRED EMBODIMENTS

Hereinafter, embodiments of the invention will be described in detail with reference to the drawings.

(1) First Embodiment

Figure 1:
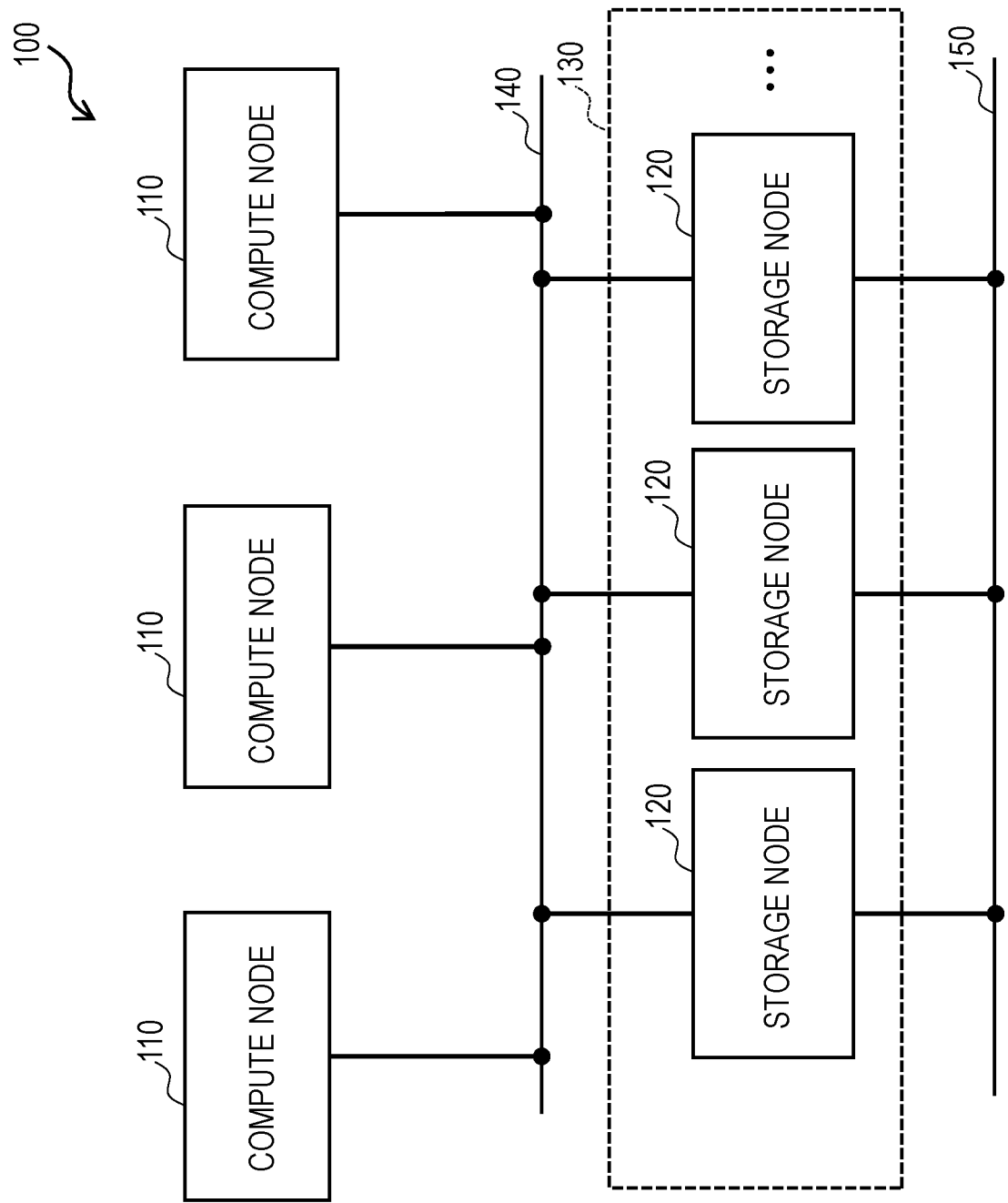
FIG. 1 is a diagram illustrating an example of the configuration of a storage system according to a first embodiment.

FIG. 1 illustrates a storage system 100 according to a first embodiment as a whole. The storage system 100 is, for example, a system into which SDS is introduced, and is configured to include a compute node 110 and a storage node 120. In the storage system 100, a level of protecting data (data protection level) can be converted. The storage node 120 required for the conversion of the data protection level is selected, and a command of the conversion of the data protection level is issued to the selected storage node 120.

As the data protection level, for example, there are Mirror, Triplication, EC (Erasure Coding), and No Protection. Further, EC is a data protection level of the configuration which withstands n failures among m data regions (referred to as mDnP; m and n are any numerical values satisfying m≥n). Further, this embodiment is not limited to the above data protection levels, but can handle various data protection levels and may be applied to a replication of quadruplication or more for example.

In the storage system 100, the data protection level can be converted. In the storage system 100, the data protection level is converted from Mirror to EC for example. In addition, for example, in the storage system 100, the data protection level is converted from Mirror to No Protection.

In addition, a unit of conversion (a target of conversion) may be the entire storage system 100, a unit of subset (for example, a protection domain described below) of a storage cluster 130, a unit of pool, or a unit of volume. For example, in a case where a unit of conversion is the entire storage system 100, the data protection level is converted for all the storage nodes 120. In addition, for example, in a case where a unit of conversion is a subset of the storage cluster 130, the data protection level is converted for the storage node 120 belonging to the subset. In addition, for example, in a case where a unit of conversion is a pool, the data protection level is converted for the storage node 120 related to the designated pool. In addition, for example, in a case where a unit of conversion is a volume, the data protection level is converted for the storage node 120 in which a designated volume is provided.

Herein, as illustrated in FIG. 1, the storage cluster 130 is configured in the storage system 100 including the plurality of storage nodes 120. In the storage cluster 130, a protection domain (not illustrated) is defined which indicates a range of data distribution in the storage cluster 130. The protection domain contains one or a plurality of storage nodes 120. Further, the protection domain may be not defined. It can be said that one protection domain is uniquely defined in the storage cluster 130.

In addition, the compute node 110 and the storage node 120 are connected to communicate with each other through a front end network 140 (storage service network). In addition, the storage nodes 120 are connected to communicate through a back end network 150.

Further, the front end network 140 and the back end network 150 may be the same. In addition, besides the front end network 140 and the back end network 150, a management network may be installed. For example, the storage node 120 and a management node (for example, a management node 1110 described below) may be connected to communicate with each other through the management network.

The network (at least one of the front end network 140, the back end network 150, and the management network) may be configured in redundancy. The network may be configured in a wired or wireless manner. In addition, the network may be other types of networks.

Figure 2:
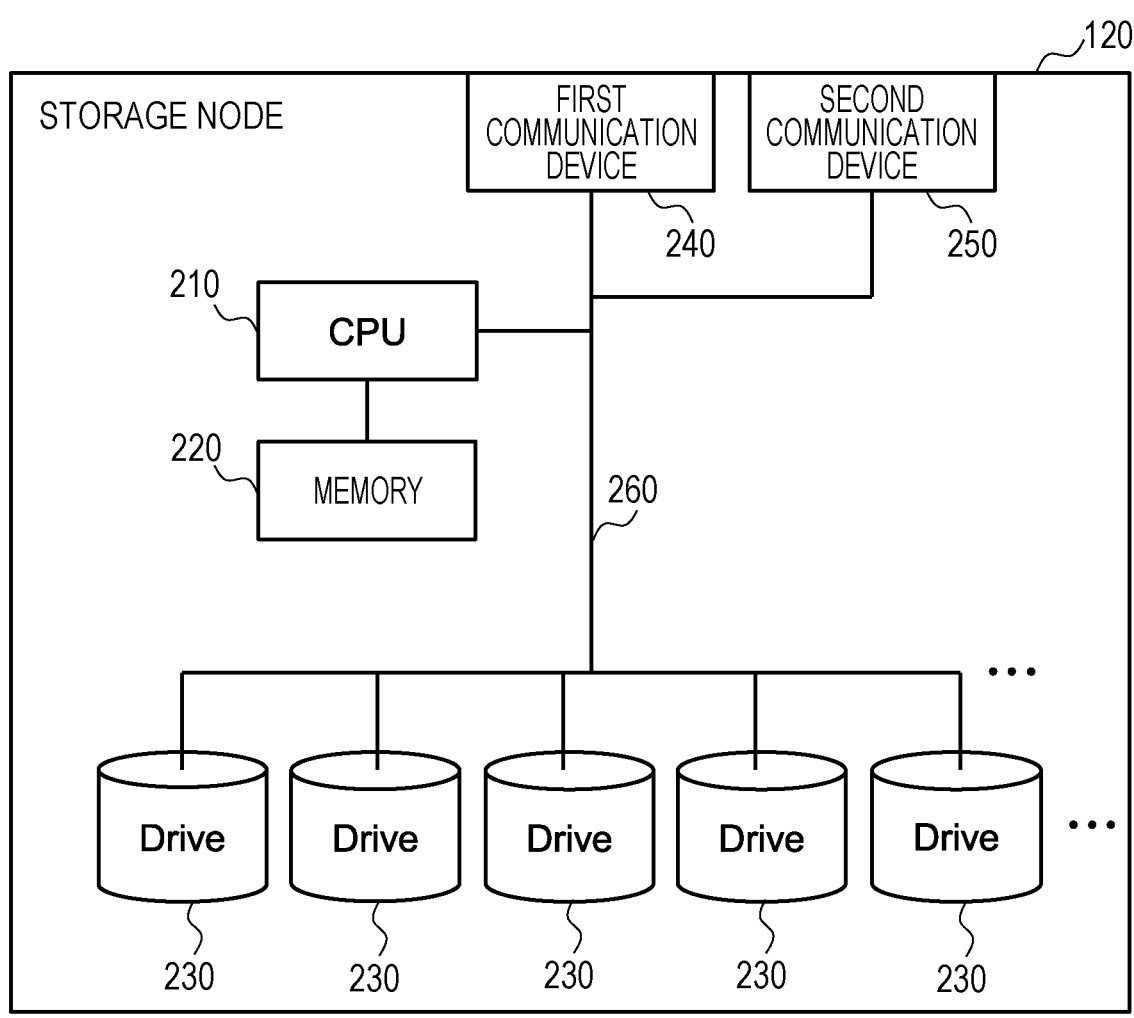
FIG. 2 is a diagram illustrating an example of the configuration of a hardware resource of a storage node according to the first embodiment.

FIG. 2 is a diagram illustrating an example of a configuration related to a hardware resource of the storage node 120.

The storage node 120 is, for example, a general purpose computer (for example, a server device). The storage node 120 is configured to include a CPU (Central Processing Unit) 210, a memory 220, a drive 230, a first communication device 240, and a second communication device 250. The respective components are connected through an inner bus 260.

The drive 230 may be an HDD (Hard Disk Drive) or an SSD (Solid State Drive) of an SAS (Serial Attached SCSI) or SATA (Serial Advanced Technology Attachment) connection, and an SSD of an NVMe (Non-Volatile Memory Express) connection, and also be a non-volatile memory (SCM: Storage Class Memory) as an example of memory devices.

The first communication device 240 is for the front end network 140 and is, for example, HBA (Host Bus Adapter) or NIC (Network Interface Card). Further, the first communication device is a device compatible with FC (Fibre Channel), Ethernet (registered trademark), and InfiniBand, and is not particularly limited. The second communication device 250 is for the back end network 150 and is, for example, HBA or NIC. Further, the second communication device 250 is a device compatible with FC, Ethernet, and InfiniBand, and is not particularly limited.

In the storage node 120, each hardware resource (the CPU 210, the memory 220, etc.) is provided by one. However, the number of hardware resources is not particularly limited, and may be one or plural. In addition, there may be provided a third communication device which is for the management network and can communicate with the management node (for example, the management node 1110 described below).

Figure 3:
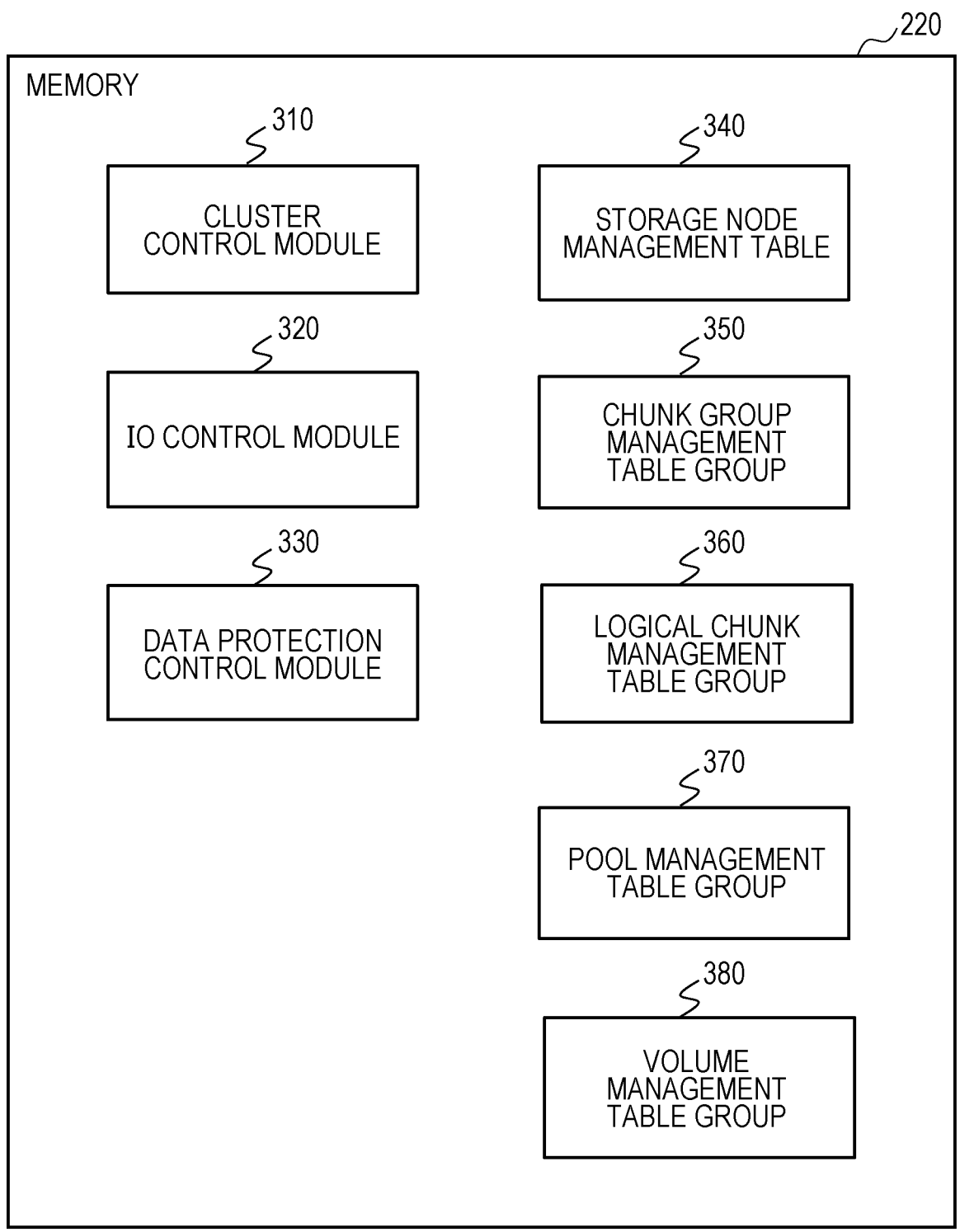
FIG. 3 is a diagram illustrating an example of data stored in a memory according to the first embodiment.

FIG. 3 is a diagram illustrating an example of data stored in the memory 220.

A cluster control module 310 monitors, for example, activation information of each storage node 120, a CPU load, a memory usage, a network usage, IOPS (Input/Output Per Second), and a hardware configuration. In addition, for example, the cluster control module 310 notifies each storage node 120 with a command of configuration change such as to create a volume and to create a pool on the basis of a request from an administrator.

An IO control module 320 is a storage control software. For example, the IO control module 320 receives a request from the compute node 110, performs an I/O process, and stores data to the drive 230 through a data protection control module 330. In addition, for example, the IO control module 320 performs processes required for the storage control such as thin-provisioning, tiering (hierarchical storage control), snapshot, compression, duplication exclusion, remote copy, and encryption.

The data protection control module 330 redundantly protects (manages) data between the storage nodes 120 at the data protection level instructed by the cluster control module 310.

The functions (the cluster control module 310, the IO control module 320, the data protection control module 330, etc.) of the storage node 120 are realized by the CPU 210 (software) which reads and performs a program to the memory 220. However, the functions are not limited to the software, but may be realized by hardware such as a dedicated circuit, or may be realized by combining hardware and software. In addition, some of the functions of the storage node 120 may be realized by another computer which can communicate with the storage node 120. Further, the cluster control module 310 may be provided in all of the storage nodes 120, or may be provided in a specific storage node 120.

In addition, a storage node management table 340, a chunk group management table group 350, a logical chunk management table group 360, a pool management table group 370, and a volume management table group 380 are stored in the memory 220. The storage node management table 340 will be described below using FIG. 4. The chunk group management table group 350 will be described below using FIG. 5. The logical chunk management table group 360 will be described below using FIG. 6. The pool management table group 370 will be described using FIGS. 7 to 9. The volume management table group 380 will be described below using FIG. 10.

FIG. 4 is a diagram illustrating an example of the storage node management table 340. The storage node management table 340 is a table to manage the storage node 120. In the storage node management table 340, information (performance information) related to the performance of the components of the storage node 120 acquired by the IO control module 320 is registered by the cluster control module 310. Further, in a case where the cluster control module 310 is provided in all the storage nodes 120, the performance information acquired by each IO control module 320 is shared by all the cluster control modules 310. On the other hand, in a case where the cluster control module 310 is provided in a specific storage node 120, the performance information is collected and registered from the IO control module 320 of each storage node 120.

In the storage node management table 340, the information of a storage node ID 401, a state 402, a domain ID 403, a capacity 404, a use capacity 405, a CPU load 406, a memory amount 407, a used memory amount 408, a communication band 409, and a use communication band 410 is stored in association.

The storage node ID 401 is an item indicating an identifier which can be used to uniquely identify the storage node 120 in the storage system 100. The state 402 is an item indicating a state (Normal, Failure, etc.) of the storage node 120. The domain ID 403 is an item indicating an identifier which can be used to uniquely identify the protection domain (the range where data is dispersed in the storage cluster 130) in the storage system 100. The capacity 404 is an item indicating the capacity of the drive 230 of the storage node 120. The use capacity 405 is an item indicating a used capacity (the capacity of a physical chunk allocated to a chunk group described below). The CPU load 406 is an item indicating a ratio of a processing time occupied by an executing program in the CPU 210. The memory amount 407 is an item indicating the capacity of the memory 220. The used memory amount 408 is an item indicating the capacity of the used memory 220. The communication band 409 is an item indicating a band of a network. The use communication band 410 is an item indicating a band of the used network. In other words, any one or both of the first communication device 240 and the second communication device 250 are provided in association with the communication band 409 and the use communication band 410.

FIG. 5 is a diagram illustrating an example of the chunk group management table group 350. The chunk group management table group 350 is a table group to manage a correspondence of the physical chunks of the chunk group. The chunk group management table group 350 is managed by, for example, the cluster control module 310 and the IO control module 320.

The chunk group is configured by a data storage region (physical chunk) of the drive 230 of the plurality of storage nodes 120 from a concept similar to a RAID group (Redundant Arrays of Inexpensive Disks Group) or a parity group of a storage sub-system. For example, the data protection level is Mirror, the chunk group is configured by two physical chunks secured from the drive 230 of another storage node 120. In addition, for example, the data protection level is 4D1P, the chunk group is configured by five physical chunks secured from the drive 230 of another storage node 120.

The chunk group management table group 350 is configured to include a chunk group management table 510 and a physical region management table 520. Further, the physical region management table 520 is provided in each chunk group.

Further, in this embodiment, in a case where the same type of elements is referred without distinction, a common portion of the reference symbols may be used. In a case where the same type of elements is referred in distinction, the reference symbol may be used. For example, in a case where the physical region management tables are referred without distinction, it will be referred to as "physical region management table 520". In a case where the physical region management tables are referred in distinction, it will be referred to as "physical region management table 520A" and "physical region management table 520B".

In the chunk group management table 510, information of a chunk group ID 511, a state 512, a data protection level 513, and an effective capacity 514 is stored in association.

The chunk group ID 511 is an item indicating an identifier which can be used to uniquely identify the chunk group in the storage system 100. The state 512 is an item indicating the state of the chunk group. As the state of the chunk group, there are "Normal", "1 Failure", "2 Failures", "1 Rebuild", "2 Rebuilds", and "Closed". For example, "1 Failure" indicates a state where a failure occurs in one physical chunk of the chunk group. "1 Rebuild" indicates a state where one physical chunk failed due to a failure of the drive 230 or a failure of the storage node 120 is rebuilt. "Closed" indicates a state where two physical chunks are not available for one chunk group in, for example, 4D1P, and is not recoverable. The data protection level 513 is an item indicating a data protection level. The effective capacity 514 is an item indicating a capacity which is available in the chunk group.

In the physical region management table 520, information of a storage node ID 521, a drive ID 522, a physical chunk ID 523, a physical capacity 524, and a state 525 is stored in association.

The storage node ID 521 is an item indicating an identifier which can be used to uniquely identify the storage node 120 in the storage system 100. The drive ID 522 is an item indicating an identifier which can be used to uniquely identify the drive 230 in the storage node 120. The physical chunk ID 523 is an item indicating an identifier which can be used to uniquely identify the physical chunk in the drive 230. The physical capacity 524 is an item indicating the capacity of the physical chunk which is allocated to the chunk group. The state 525 is an item indicating a state (Normal, Failure, etc.) of the physical chunk.

Further, FIG. 5 illustrates an example where the capacity of the physical chunk is fixed (100 GB) in the storage system 100, but the capacity is not limited thereto. For example, the capacity of the physical chunk may be different in the physical capacity (size) for every chunk group.

Figure 6:
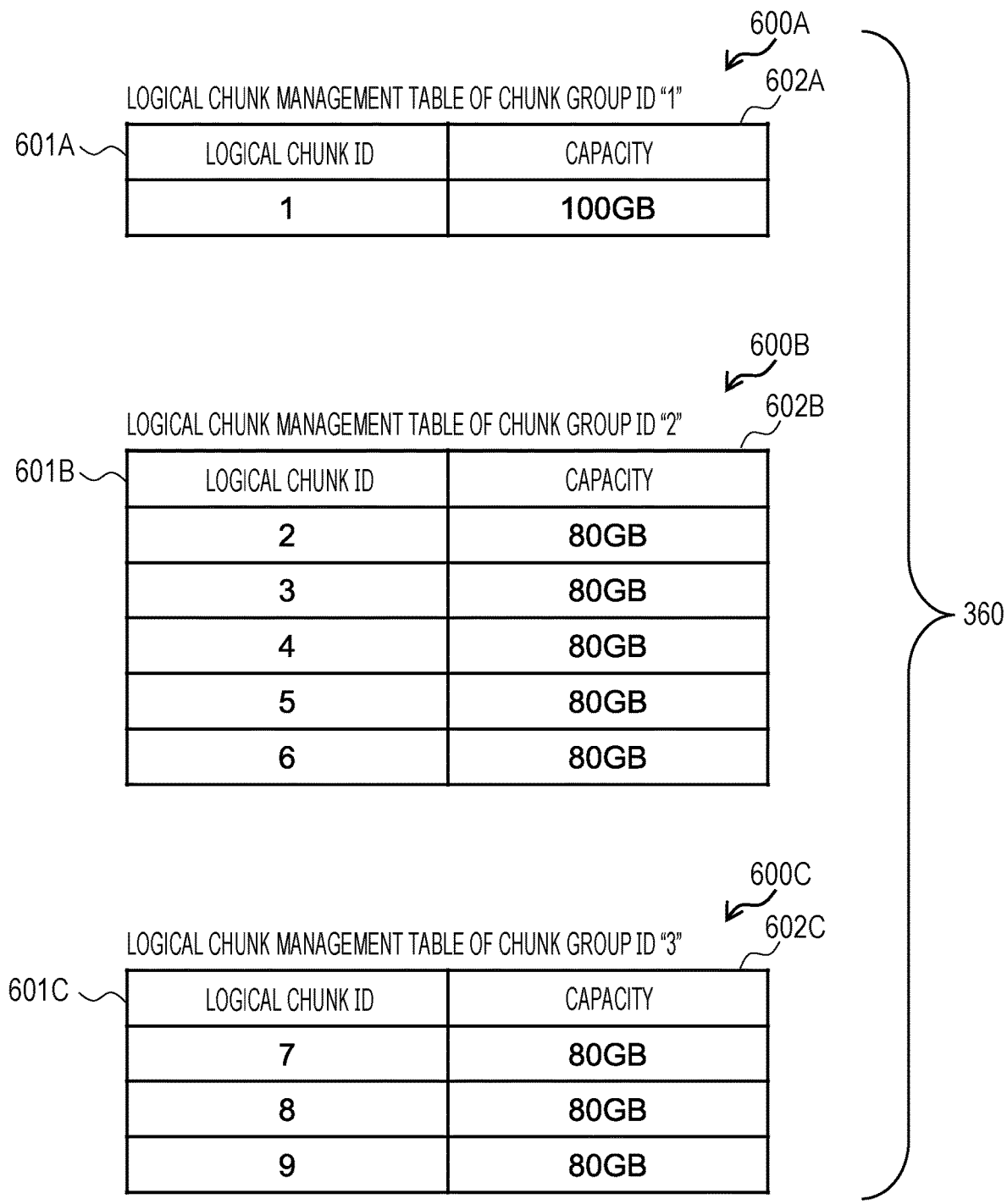
FIG. 6 is a diagram illustrating an example of a logical chunk management table group according to the first embodiment.

FIG. 6 is a diagram illustrating an example of the logical chunk management table group 360. The logical chunk management table group 360 is a table group to manage an extracted logical chunk. The logical chunk management table group 360 is managed by, for example, the cluster control module 310 and the IO control module 320.

The logical chunk is a unit of allocating a capacity to a pool of each storage node 120 which is extracted from each chunk group. One logical chunk may be extracted from one chunk group, or a plurality of logical chunks may be extracted. In other words, the extracting of a logical unit (LU) from the parity group (RAID group) is a similar concept.

The logical chunk management table group 360 is configured to include a logical chunk management table 600 for each chunk group. In the logical chunk management table 600, information of a logical chunk ID 601 and a capacity 602 is stored in association.

The logical chunk ID 601 is an item indicating an identifier which can be used to uniquely identify the logical chunk in the storage system 100. The capacity 602 is an item indicating the capacity of the logical chunk. For example, as illustrated in FIG. 5, in a case where the chunk group ID is "3", the effective capacity 514 is "800 GB". However, in FIG. 6, a capacity 602C extracts only three logical chunks of "80 GB", so that it can be seen that seven logical chunks of "80 GB" can be additionally extracted. Further, in the example of FIG. 6, the capacity 602 is illustrated with the same value (100 GB or 80 GB) in one chunk group, but the capacity is not limited thereto. Even in one chunk group, the value of the capacity 602 may be different (or the logical chunks of different capacities may be mixed even in the same chunk group).

Figure 7:
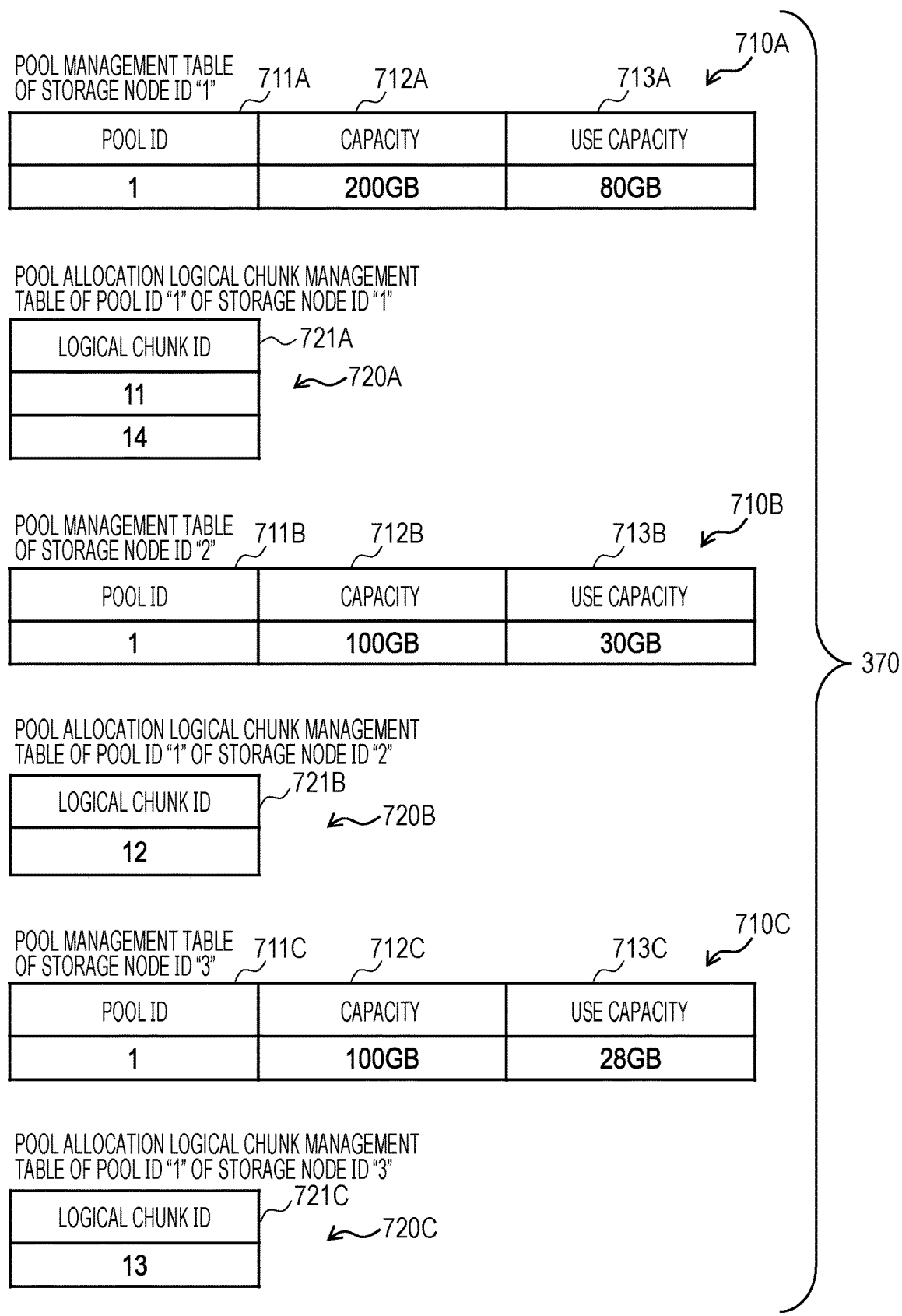
FIG. 7 is a diagram illustrating an example of a pool management table group according to the first embodiment.
Figure 8:
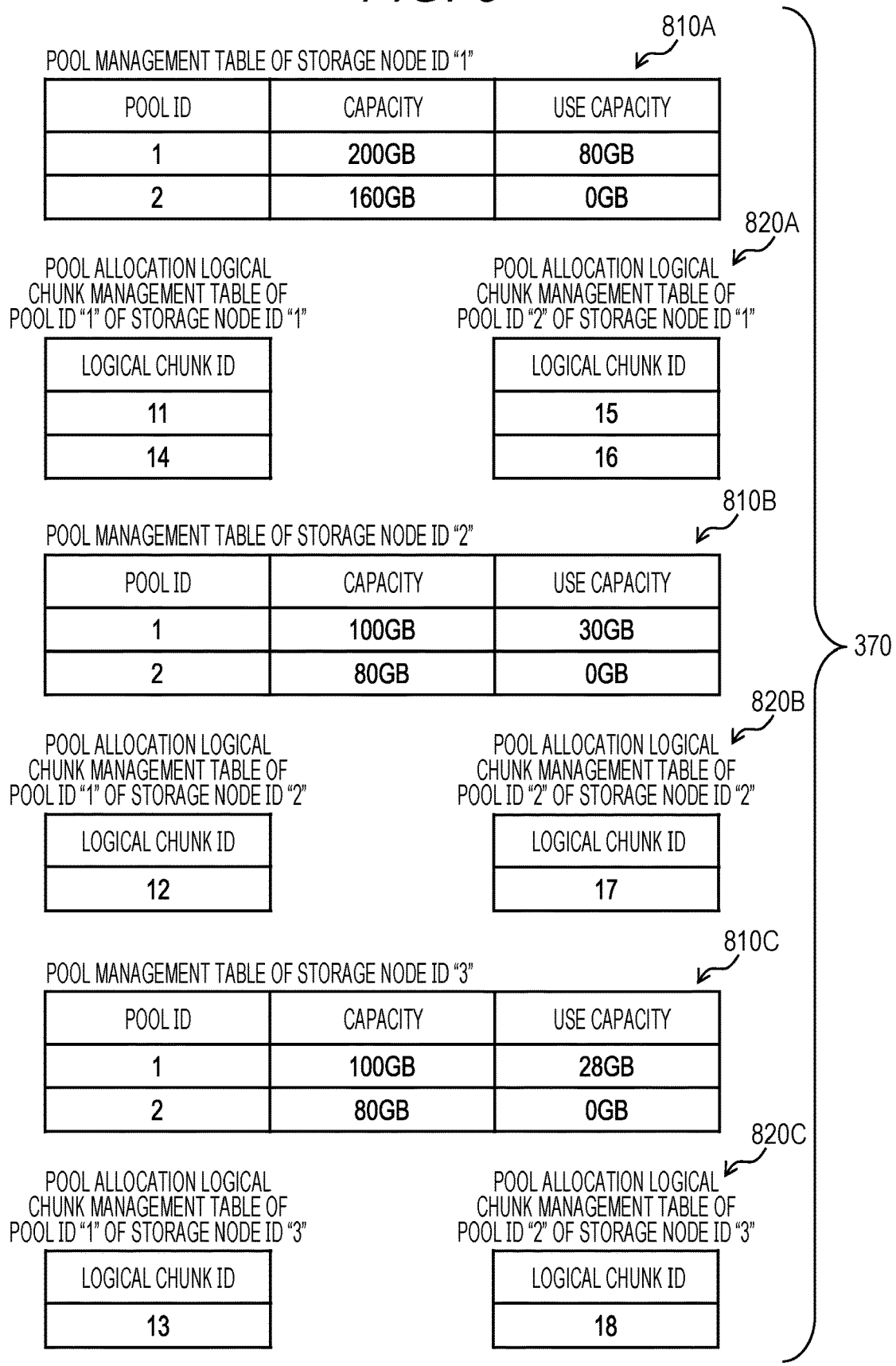
FIG. 8 is a diagram illustrating an example of the pool management table group according to the first embodiment.
Figure 9:
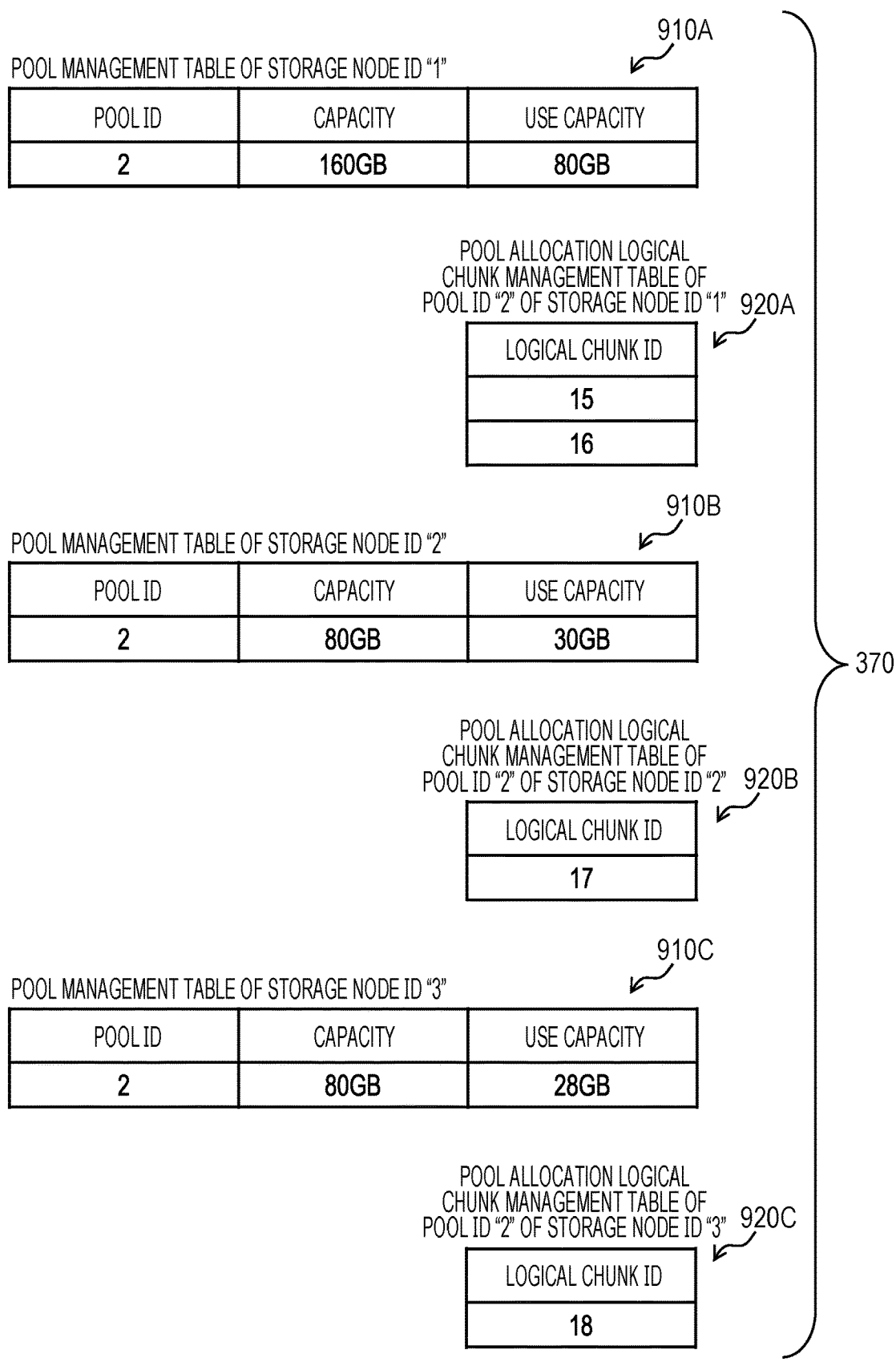
FIG. 9 is a diagram illustrating an example of the pool management table group according to the first embodiment.

FIGS. 7 to 9 are diagrams illustrating examples of the pool management table group 370. The pool management table group 370 is a table group to manage a pool. The pool management table group 370 is managed by, for example, the IO control module 320.

The pool management table group 370 is configured to include a pool management table 710 to manage a pool provided in the storage node 120, and a pool allocation logical chunk management table 720 to manage a logical chunk allocated to the pool. The pool management table 710 and the pool allocation logical chunk management table 720 are provided for each storage node 120.

In the pool management table 710, information of a pool ID 711, a capacity 712, and a use capacity 713 is stored in association.

The pool ID 711 is an item indicating an identifier which can be used to uniquely identify a pool in the storage node 120. The capacity 712 is an item indicating a total sum of the capacities of the logical chunks allocated to a pool. The use capacity 713 is an item indicating a capacity which is actually used.

In the pool allocation logical chunk management table 720, information of a logical chunk ID 721 is stored. The logical chunk ID 721 is an item indicating an identifier which can be used to uniquely identify the logical chunk in the storage system 100. Further, in order to store data, one or more logical chunks are necessarily allocated to a pool.

Herein, FIG. 7 is a diagram illustrating an example of the pool management table group 370 before the conversion of the data protection level when a unit of conversion of the data protection level is the whole storage system 100.

In this example, in the storage system 100, the storage node 120 (a first storage node 120) of the storage node ID "1" is provided with a pool of the pool ID "1" to which the logical chunk of the logical chunk ID "11" and the logical chunk of the logical chunk ID "14" are allocated. In addition, in the storage system 100, the storage node 120 (a second storage node 120) of the storage node ID "2" is provided with a pool of the pool ID "1" to which the logical chunk of the logical chunk ID "12" is allocated. In addition, in the storage system 100, the storage node 120 (a third storage node 120) of the storage node ID "3" is provided with the pool of the pool ID "1" to which the logical chunk of the logical chunk ID "13" is allocated.

In addition, in this example, in the pool of the first storage node 120, the pool of the second storage node 120, and the pool of the third storage node 120, the same data protection level (for example, the data protection level of Mirror) is provided, and a unit of conversion of the data protection level is the entire storage system 100. Therefore, these pools are converted to the designated data protection level (for example, the data protection level of 4D1P). Further, at this time, the conversion of the data protection level in each pool (for example, migration of data) may be performed in parallel, or may be performed in series (sequentially).

Herein, in the conversion of the data protection level, for example, a pool of a migration destination is provided in correspondence with a pool of a migration source. For example, during the conversion of the data protection level, as illustrated in FIG. 8, the information related to the pool (the pool of the pool ID "1") of the migration source and the information related to the pool (the pool of the pool ID "2") of the migration destination are stored in the pool management table group 370.

FIG. 8 is a diagram illustrating an example of the pool management table group 370 during the conversion of the data protection level when a unit of conversion of the data protection level is the whole storage system 100. In this example, in each of the first storage node 120, the second storage node 120, and the third storage node 120, the pool (the pool of the migration destination) of the pool ID "2" is created with respect to the pool (the pool of the migration source) of the pool ID "1".

In addition, after the conversion of the data protection level, as illustrated in FIG. 9, the information related to the pool of the migration source is erased from the pool management table group 370.

FIG. 9 is a diagram illustrating an example of the pool management table group 370 after the conversion of the data protection level when a unit of conversion of the data protection level is the whole storage system 100. In this example, in each of the first storage node 120, the second storage node 120, and the third storage node 120, the pool (the pool of the migration source) of the pool ID "1" is erased.

Further, in FIGS. 7 to 9, the pool ID "1" (the pool of the migration source) and the pool ID "2" (the pool of the migration destination) are provided in each storage node 120, but the pool of the migration source and the pool of the migration destination may be provided in plural places in the storage node 120.

FIG. 10 is a diagram illustrating an example of the volume management table group 380. The volume management table group 380 is a table group to manage a volume extracted from a pool. The volume management table group 380 is managed by, for example, the IO control module 320. The volume management table group 380 is configured to include a volume management table 1000 for each pool of the storage node 120.

In the volume management table 1000, information of a volume ID 1001, a capacity 1002, and a use capacity 1003 is stored in association.

The volume ID 1001 is an item indicating an identifier which can be used to uniquely identify a volume in the storage system 100. The capacity 1002 is an item indicating a capacity of a volume. The use capacity 1003 is an item indicating a capacity which is actually used.

Figure 11:
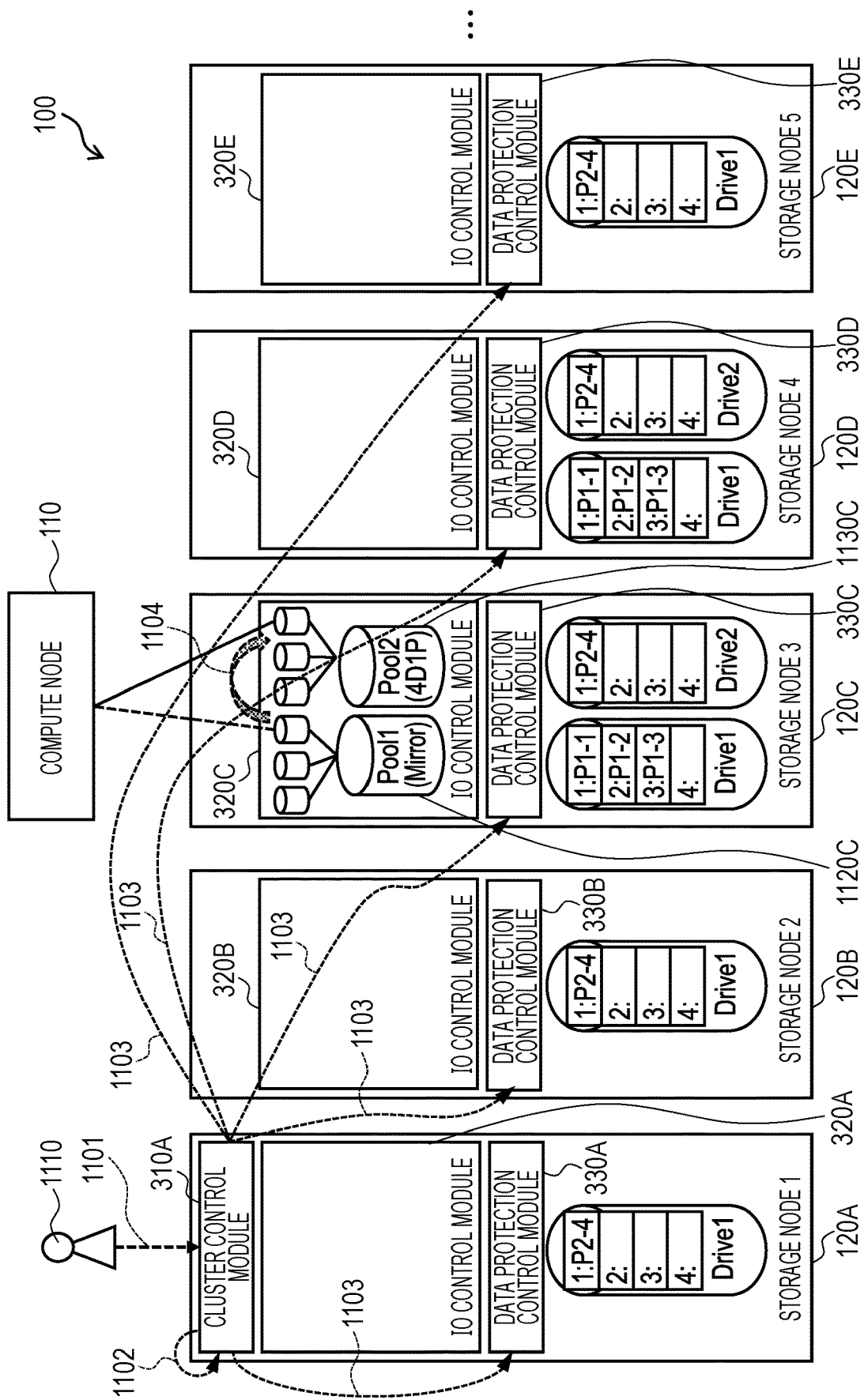
FIG. 11 is an image diagram of a conversion of a data protection level according to the first embodiment.

In this embodiment, the conversion of the data protection level is performed in the storage system 100 in a procedure illustrated in FIG. 11 for example.

FIG. 11 is an image diagram of the conversion of the data protection level. As a unit of conversion of the data protection level, the entire storage system 100, the subset (for example, the protection domain) of the storage cluster 130, the pool, or the volume may be selected. In FIG. 11, a pool 1120C is selected through the management node 1110 as a unit of conversion of the data protection level, and there is issued a command to convert the data protection level into 4D1P.

(Procedure 1101: Designation of Conversion of Data Protection Level)

The management node 1110 operated by the administrator issues, to a cluster control module 310A, a convert command (an example of request) which includes the information related to the data protection level (in this example, the information indicating that the pool 1120C is selected as a unit of conversion of the data protection level, and the information indicating that the data protection level is converted into 4D1P, etc.).

(Procedure 1102: Selection of Storage Node 120)

The cluster control module 310A selects the number of storage nodes required for setting the data protection level after conversion (for example, in the case of Mirror, "2" or more; in the case of EC, among m data regions; and in the configuration (mDnP) withstanding n failures, m+n or more) from the storage cluster 130 or the protection domain on the basis of the convert command.

(Procedure 1103: Generation of Chunk Group)

The cluster control module 310A issues a command to the data protection control module 330 of each selected storage node 120 such that the chunk group of the data protection level after conversion is generated and combined. In addition, the cluster control module 310A issues a command to an IO control module 320C such that data is migrated from the pool of the migration source to the pool of the migration destination.

(Procedure 1104: Migration of Data)

The IO control module 320C creates a pool 1130C corresponding to the data protection level after conversion, and the migration of a volume from the pool 1120C to the pool 1130C is performed. Further, a well-known technique may be employed in the migration of a volume. During the migration of a volume, an IO from the compute node 110 is taken over.

Herein, in FIG. 11, a part (physical chunk) of the data region is illustrated in "Drive 1" and "Drive 2" of each storage node 120. "y" in Px-y in a physical chunk represents the chunk group ID of the chunk group of the physical chunk, and "x" represents the pool ID of the pool to which the logical chunk extracted from the chunk group is allocated.

Further, a storage node 120A is provided with the cluster control module 310A, but the cluster control module 310 may be provided in all of the storage nodes 120.

Next, the process related to the conversion of the data protection level will be described using FIGS. 12 to 18.

Figure 12:
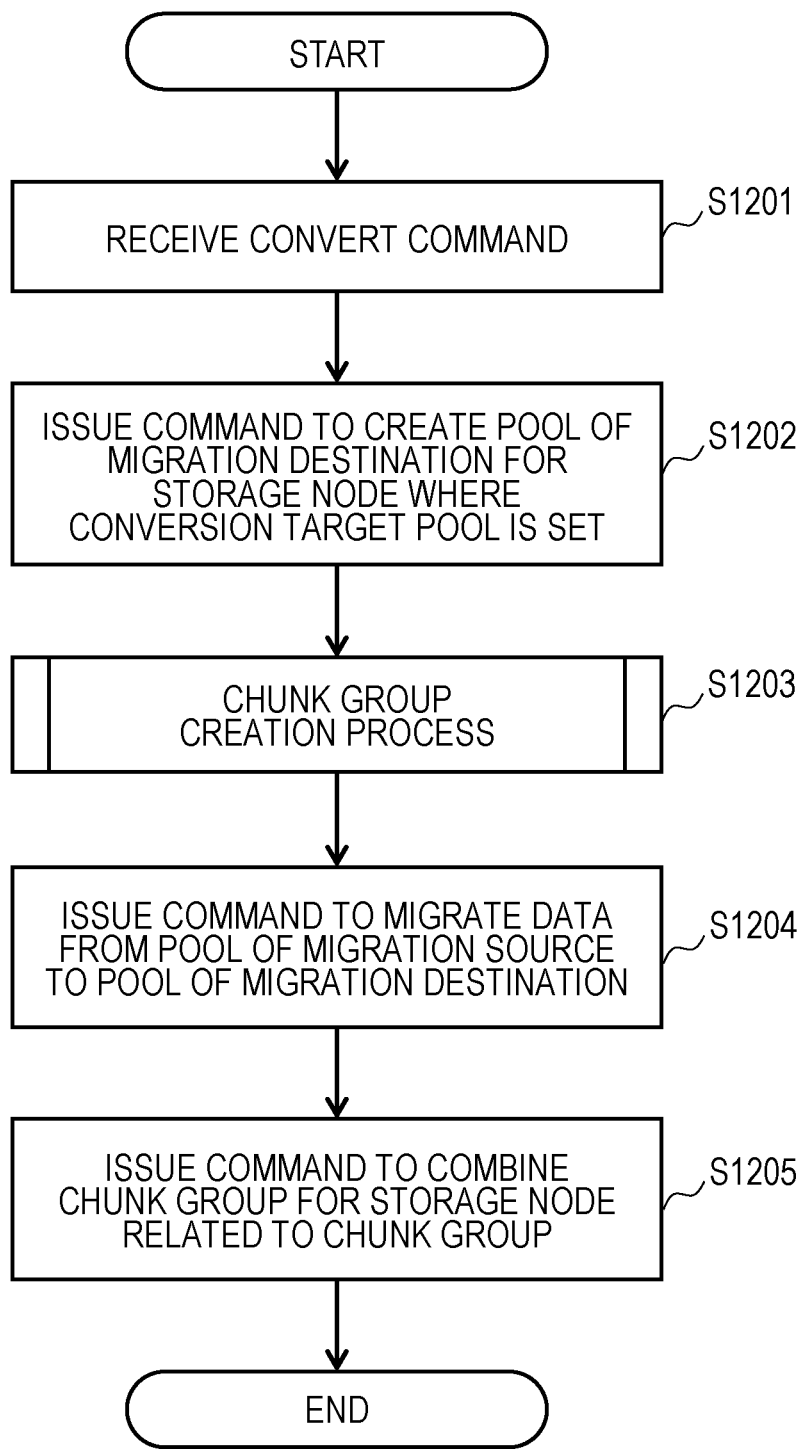
FIG. 12 is a flowchart illustrating an example of a process performed by a cluster control module according to the first embodiment.

FIG. 12 is a flowchart illustrating an example of the process of the cluster control module 310.

First, the cluster control module 310 receives the convert command from the management node (Step S1201). The convert command includes, for example, information (the information of the entire storage system 100, the protection domain ID, the pool ID, or the volume ID) indicating that a unit of conversion of the data protection level is selected, information (the data protection level (for example, Mirror), the information of the storage node ID, etc.) indicating the data protection level before conversion, and information (the data protection level (for example, 4D1P), etc.) indicating the data protection level after conversion. Further, in a case where the conversion is performed in a predetermined unit, the information indicating that a unit of conversion of the data protection level is selected may be not included.

Subsequently, the cluster control module 310 issues a command (pool creation command) to create a pool of the migration destination to the storage node 120 in which a pool of the migration source (conversion target) is set (Step S1202).

For example, in a case where the entire storage system 100 is selected as a unit of conversion of the data protection level, the cluster control module 310 issues a command to create a pool of the migration destination with respect to the entire storage node 120 provided with a pool where the data protection level before conversion is set in the storage system 100.

In addition, for example, in a case where the protection domain is selected as a unit of conversion of the data protection level, the cluster control module 310 issues a command to create a pool of the migration destination with respect to the entire storage node 120 provided with a pool where the data protection level before conversion is set in the protection domain.

In addition, for example, in a case where a pool is selected as a unit of conversion of the data protection level, the cluster control module 310 issues a command to create a pool of the migration destination with respect to the storage node 120 where the pool is provided.

In addition, for example, in a case where a volume is selected as a unit of conversion of the data protection level, the cluster control module 310 issues a command to create a pool of the migration destination with respect to the storage node 120 where the pool with the volume extracted is provided.

Further, the IO control module 320 of the storage node 120 which receives the pool creation command creates a pool of the migration destination. At this time, in a case where there is already a pool of which the data protection level after conversion is set, the IO control module 320 may not create a pool.

Subsequently, the cluster control module 310 performs a chunk group creation process (Step S1203). In the chunk group creation process, the cluster control module 310 selects the number of storage nodes required for setting the data protection level after conversion from the storage cluster 130 or from the protection domain, and creates a chunk group of the physical chunk of the data protection level after conversion.

Herein, as described above, the chunk group of the data amount required on the basis of the convert command is created in advance with respect to the chunk group creation process. As described below, the chunk group may be created as needed in accordance with a progress of a copy process in a data protection level conversion process of copy necessary, or the chunk group creation process may be performed at any timing. Further, the chunk group creation process will be described using FIG. 16.

The cluster control module 310 issues a command (data migration command) to migrate data from the pool of the migration source to the pool of the migration destination with respect to the storage node 120 where the pool of the migration source and the pool of the migration destination are set (Step S1204). The storage node 120 which receives the data migration command performs a data migration process illustrated in FIG. 13 described below. In the data migration process, the data is migrated from the pool of the migration source to the pool of the migration destination.

The cluster control module 310 issues a command (chunk group setting command) to combine the chunk groups with respect to the data protection control module 330 of the storage node 120 (the storage node 120 selected in Step S1203) related to the created chunk group (Step S1205).

The data protection control module 330 which receives the chunk group setting command manages (protects) the data received from the IO control module 320 at the data protection level after conversion by combining the chunk groups corresponding to the data protection level after conversion.

Figure 13:
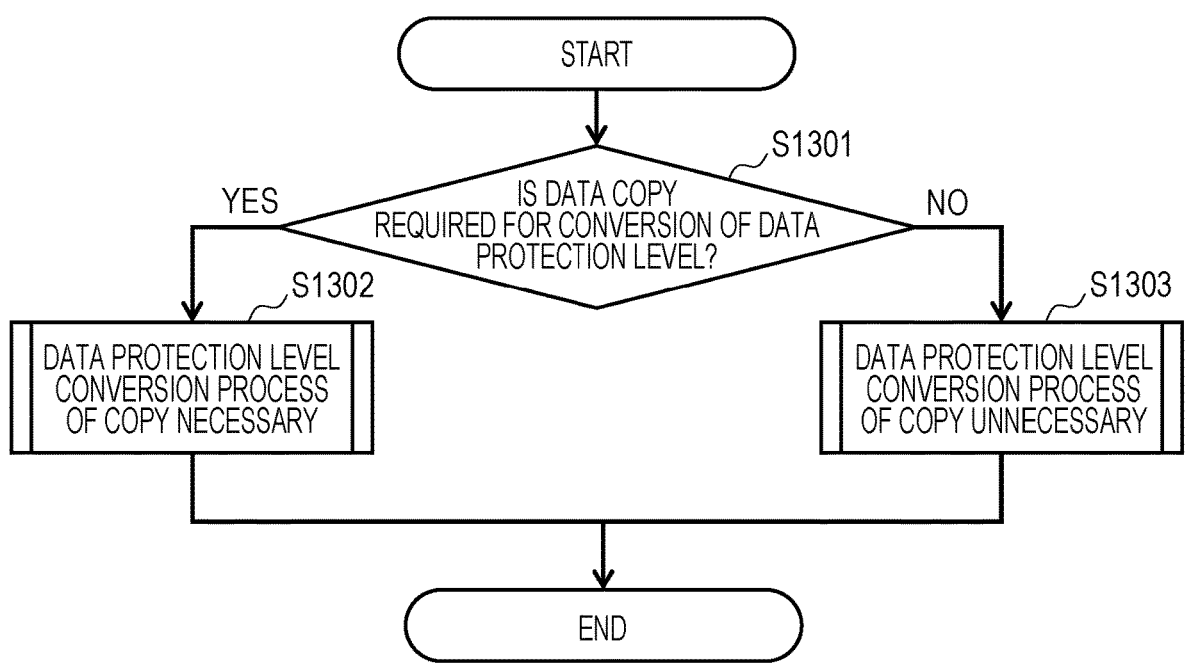
FIG. 13 is a flowchart illustrating an example of a data migration process according to the first embodiment.

FIG. 13 is a flowchart illustrating an example of the data migration process which is performed by the IO control module 320 on the basis of the data migration command transmitted from the cluster control module 310. Further, in a case where there are a plurality of pools of the migration source, the data migration process is repeatedly performed as many as the pools of the migration source.

Herein, the data migration command includes, for example, information of the data protection level of the migration source, the storage node ID of the migration source, the pool ID of the migration source, the data protection level of the migration destination, the storage node ID of the migration destination, and the pool ID of the migration destination.

First, the IO control module 320 determines whether there is a need to copy data in the conversion of the data protection level (whether or not the data of the data protection level before conversion and the data of the data protection level after conversion are matched) (Step S1301). In a case where the IO control module 320 determines that the copying is necessary, the process proceeds to Step S1302. In a case where the copying is not necessary, the IO control module proceeds to the process of Step S1303. For example, in a case where the data protection level of the migration destination is set from a replication of Mirror or Triplication of the migration source to No Protection, the IO control module 320 determines that there is no need to copy data in the conversion of the data protection level.

In Step S1302, the IO control module 320 performs the data protection level conversion process of copy necessary, and ends the data migration process. In the data protection level conversion process of copy necessary, for example, the entire volume of the pool of the migration source is migrated (copied) to the migration destination. Further, the data protection level conversion process of copy necessary will be described using FIGS. 14 to 17C.

In Step S1303, the IO control module 320 performs the data protection level conversion process of copy unnecessary, and ends the data migration process. In the data protection level conversion process of copy unnecessary, all the logical chunks of the pool of the migration source are replaced to the pool of the migration destination, and the copying of data is not performed. Further, the data protection level conversion process of copy unnecessary will be described using FIG. 18.

Figure 14:
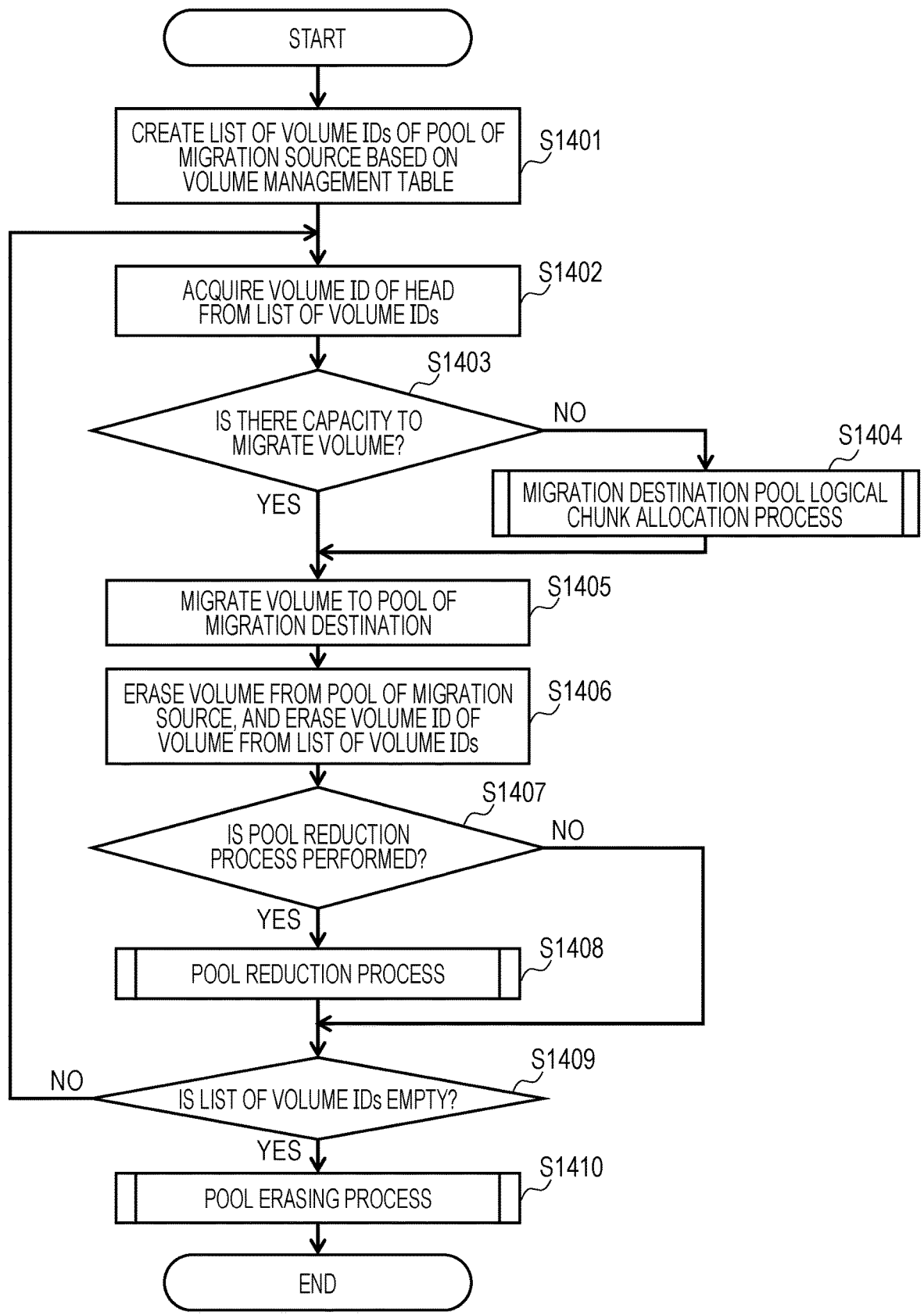
FIG. 14 is a flowchart illustrating an example of a data protection level conversion process of copy necessary according to the first embodiment.

FIG. 14 is a flowchart illustrating an example of the data protection level conversion process of copy necessary. Further, the data protection level conversion process of copy necessary will be described as a case where the pool of the migration destination is created at proper timing.

First, the IO control module 320 creates a list of volume IDs of the volumes extracted from the pool of the migration source on the basis of the volume management table 1000 (Step S1401).

In Step S1402, the IO control module 320 acquires a volume ID of the head from the list of the volume IDs.

Subsequently, the IO control module 320 determines whether there is a capacity to migrate the volume (the corresponding volume) of the acquired volume ID on the basis of the capacity and the use capacity of a pool management table 810 and the use capacity of the volume management table 1000 (Step S1403). In a case where the IO control module 320 determines that there is the capacity, the process proceeds to Step S1405. In a case where it is determined that there is no capacity, the process proceeds to Step S1404.

In Step S1404, the IO control module 320 performs a migration destination pool logical chunk allocation process, and the process proceeds to Step S1405. In the migration destination pool logical chunk allocation process, the logical chunk is allocated to the pool of the migration destination, and the chunk group is created. Further, the migration destination pool logical chunk allocation process will be described below using FIG. 15.

In Step S1405, the IO control module 320 migrates (copies) the volume to the pool of the migration destination.

Subsequently, the IO control module 320 erases the volume from the pool of the migration source, and erases the volume ID of the volume from the list of the volume IDs (Step S1406).

Subsequently, the IO control module 320 determines whether a pool reduction process is performed (Step S1407). In a case where the IO control module 320 determines to perform, the process proceeds to Step S1408. In a case where it is determined not to perform, the process proceeds to Step S1409. For example, the IO control module 320 determines to perform the pool reduction process in a case where the capacity of data before and after conversion is not possible to be stored (for example, the use capacity of nodes before the data protection level is converted exceeds 50% of the total capacity) when the data protection level conversion process is performed in a unit of node.

In Step S1408, the IO control module 320 performs the pool reduction process. In the pool reduction process, for example, in a case where a free capacity of the pool of the migration source is equal to or more than the free capacity of the erasing-target logical chunk, the IO control module 320 migrates data in the pool to make the erasing-target logical chunk empty. Further, the pool reduction process will be described below using FIG. 17A.

Subsequently, the IO control module 320 determines whether the list of the volume IDs is empty (Step S1409). In a case where the IO control module 320 determines that the list is empty, the process proceeds to Step S1410. In a case where it is determined that the list is not empty, the process proceeds to Step S1402.

In Step S1410, the IO control module 320 performs a pool erasing process, and ends the data protection level conversion process of copy necessary. In the pool erasing process, for example, in a case where there are logical chunks left in the pool, the IO control module 320 erases all the logical chunks and then erases the pool. Further, the pool erasing process will be described below using FIG. 17B.

Figure 15:
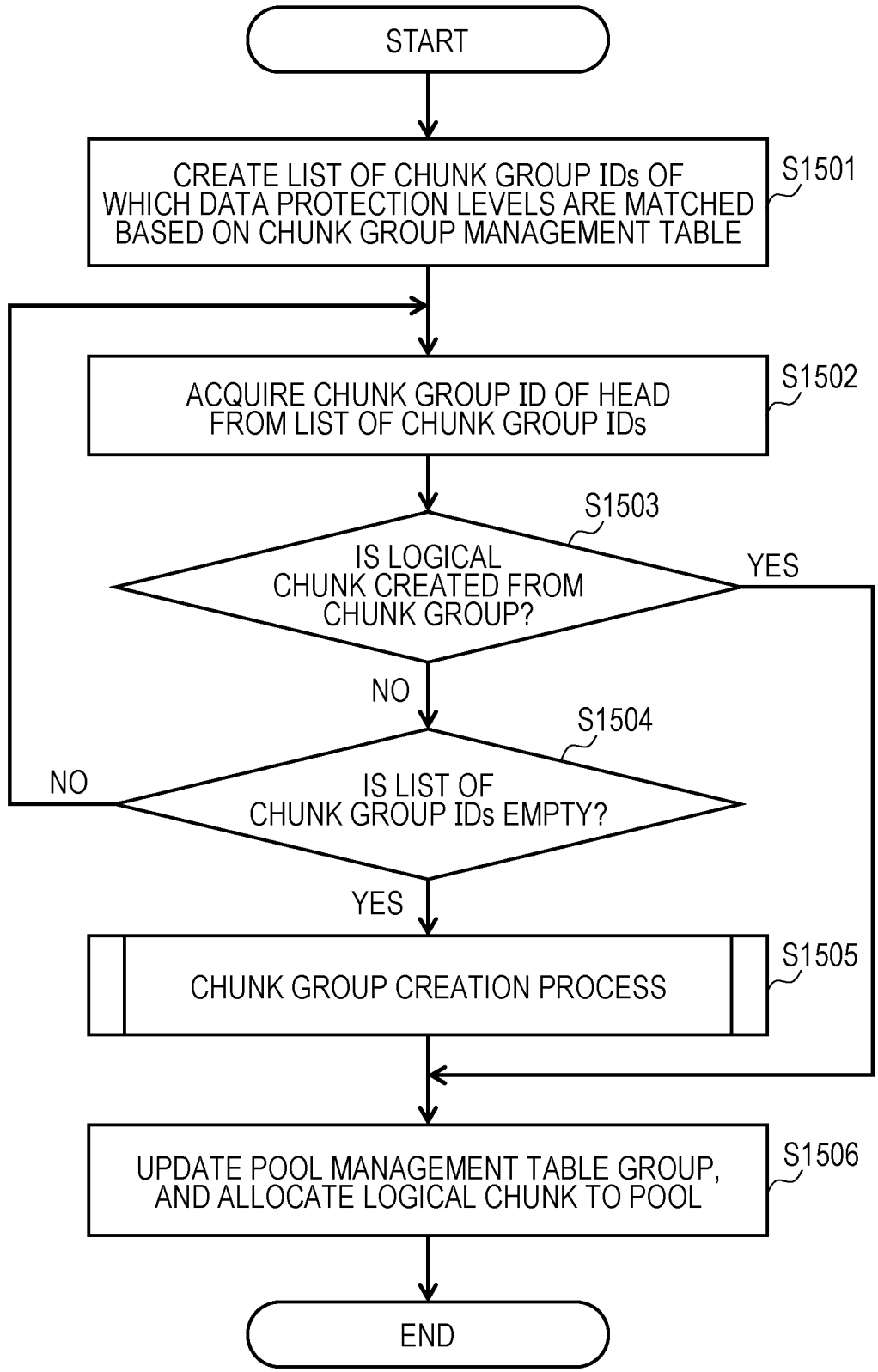
FIG. 15 is a flowchart illustrating an example of a migration destination pool logical chunk allocation process according to the first embodiment.

FIG. 15 is a flowchart illustrating an example of the migration destination pool logical chunk allocation process.

First, the IO control module 320 creates a list of the chunk group IDs of the chunk groups of which the data protection levels are matched on the basis of the chunk group management table 510 (Step S1501).

In Step S1502, the IO control module 320 acquires the chunk group ID of the head from the list of the chunk group IDs.

Subsequently, the IO control module 320 determines whether the logical chunks equal to or more than the capacity required for the migration is extracted (created)

from the chunk group (the corresponding chunk group) of the acquired chunk group ID on the basis of the effective capacity of the chunk group management table 510 and the capacity of the logical chunk management table 600 (Step S1503). In a case where the IO control module 320 determines that the logical chunks are extracted, the process proceeds to Step S1506. In a case where it is determined that the extraction is not performed, the process proceeds to Step S1504.

In Step S1504, the IO control module 320 determines whether the list of the chunk group IDs is empty. In a case where the IO control module 320 determines that the list is empty, the process proceeds to Step S1505. In a case where it is determined that the list is not empty, the chunk group ID of the chunk group is erased from the list, and the process proceeds to Step S1502.

In Step S1505, the IO control module 320 performs the chunk group creation process. In the chunk group creation process, the chunk group is created. Further, the chunk group creation process will be described using FIG. 16.

In Step S1506, the IO control module 320 updates the pool management table group 370, allocates the logical chunk to the pool, and ends the migration destination pool logical chunk allocation process.

Figure 16:
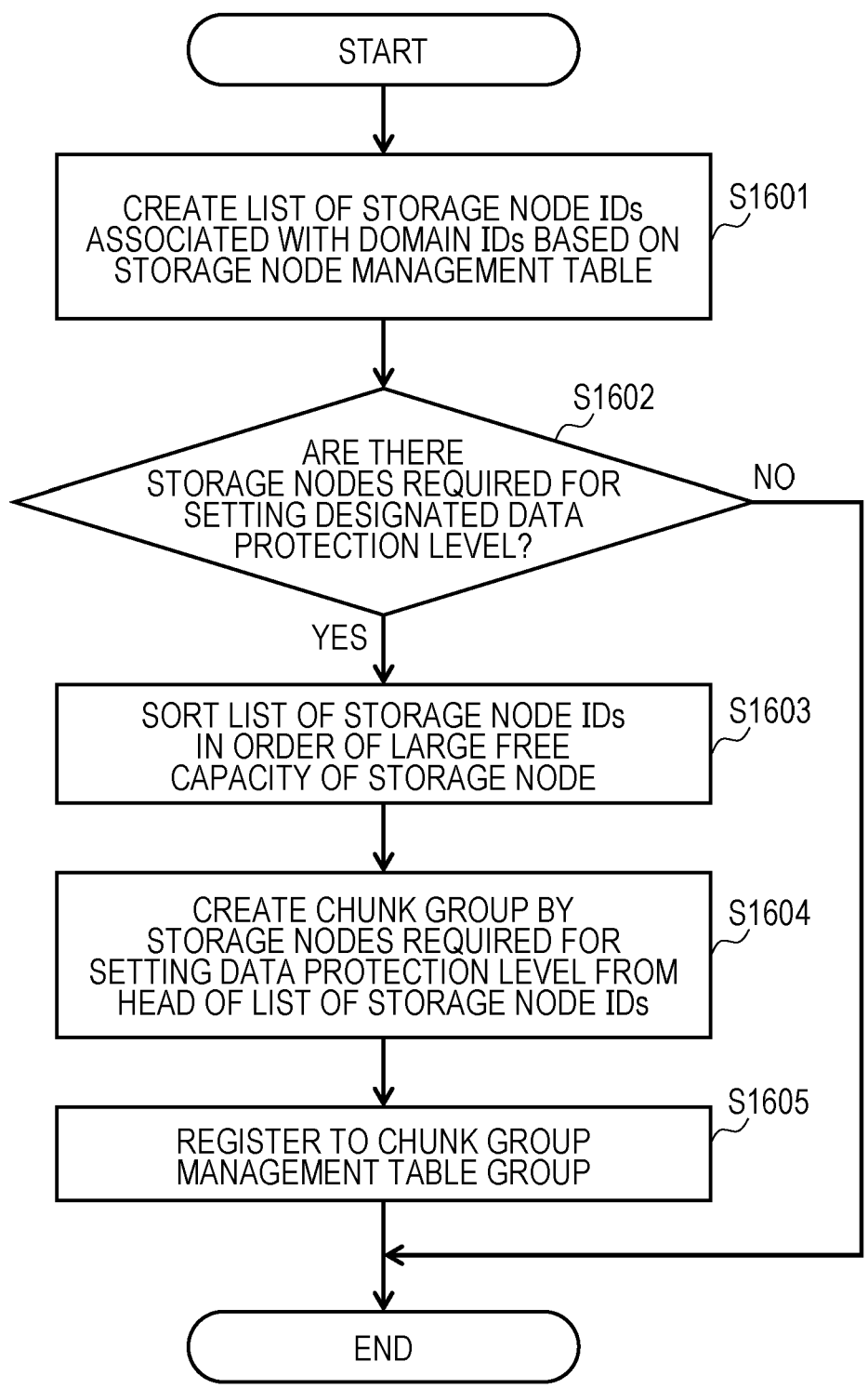
FIG. 16 is a flowchart illustrating an example of a chunk group creation process according to the first embodiment.

FIG. 16 is a flowchart illustrating an example of the chunk group creation process. Further, the description in the following will be given using the IO control module 320 as a processing entity, but the processing entity will be the cluster control module 310 when being called from Step S1203.

First, the IO control module 320 creates a list of the storage node IDs associated with the domain ID of the protection domain to which the storage node 120 where the pool of the migration source is set belongs on the basis of the storage node management table 340 (Step S1601).

Subsequently, the IO control module 320 determines whether there are storage nodes 120 (the number of storage nodes) as many as required for setting the designated data protection level (the data protection level after conversion) (Step S1602). In a case where the IO control module 320 determines that there are as many storage nodes as required, the process proceeds to Step S1603. In a case where it is determined that there are not as many storage nodes as required, an error process is performed, and the chunk group creation process ends. For example, since the free capacity in each storage node 120 may be changed in the error process after a predetermined time elapses as described above, the chunk group creation process may be performed again.

In Step S1603, the IO control module 320 sorts the list of the storage node IDs in an order of a large free capacity (=Capacity−Use Capacity) of the storage node 120 on the basis of the storage node management table 340.

Subsequently, the IO control module 320 creates the chunk group as many as the number of storage nodes required for setting the data protection level from the head of the list of the storage node ID (Step S1604). According to this process, the storage node 120 having a large free capacity is used first, so that the use capacity of the storage node 120 is even. Further, at this time, for example, the IO control module 320 issues a command (chunk group setting command) to combine the chunk group with respect to the data protection control module 330 of each storage node 120 related to the created chunk group.

Subsequently, the IO control module 320 registers the information of the created chunk group to the chunk group management table group 350 (Step S1605), and ends the chunk group creation process.

Figure 17A:
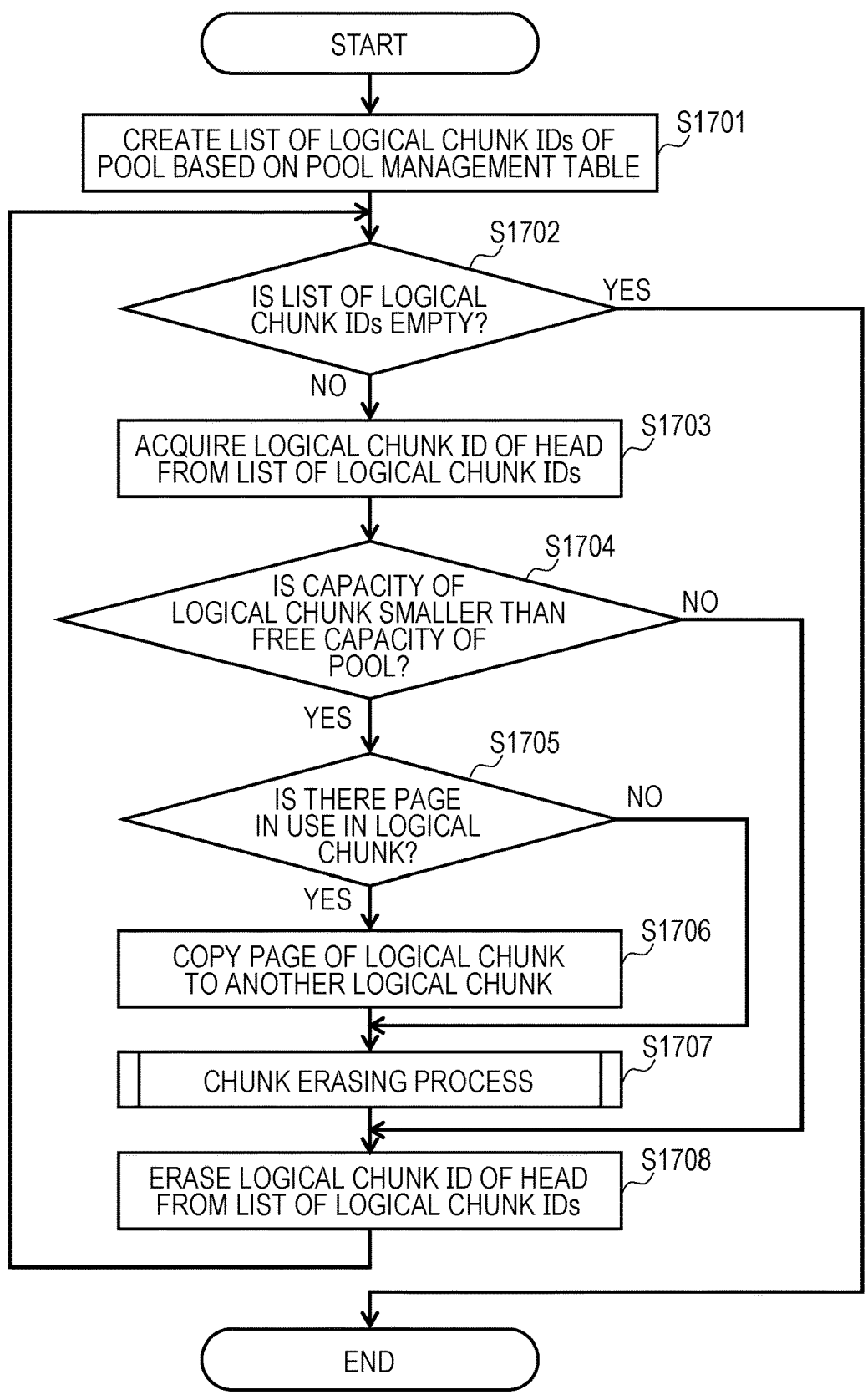
FIG. 17A is a flowchart illustrating an example of a pool reduction process according to the first embodiment.

FIG. 17A is a flowchart illustrating an example of the pool reduction process.

First, the IO control module 320 creates a list of logical chunk IDs of the pool (the corresponding pool) of the migration source on the basis of the pool management table 810 (Step S1701).

Subsequently, the IO control module 320 determines whether the list of the logical chunk IDs is empty (Step S1702). In a case where the IO control module 320 determines that the list is empty, the pool reduction process ends. In a case where it is determined that the list is not empty, the process proceeds to Step S1703.

In Step S1703, the IO control module 320 acquires the logical chunk ID of the head from the list of the logical chunk IDs.

Subsequently, the IO control module 320 determines whether the capacity of the logical chunk (the corresponding logical chunk) of the acquired logical chunk ID is smaller than the free capacity of the pool (Step S1704). In a case where the IO control module 320 determines that the capacity is small, the process proceeds to Step S1705. In a case where it is determined that the capacity is not small, the process proceeds to Step S1708.

In Step S1705, the IO control module 320 determines whether there is a page in use in the logical chunk. In a case where the IO control module 320 determines that there is a page in use, the process proceeds to Step S1706. In a case where it is determined that there is no page in use, the process proceeds to Step S1707.

In Step S1706, the IO control module 320 copies the page of the logical chunk to another logical chunk.

In Step S1707, the IO control module 320 performs a chunk erasing process. In the chunk erasing process, the logical chunk (the erasing-target logical chunk) is erased. Further, the chunk erasing process will be described using FIG. 17C.

In Step S1708, the IO control module 320 erases the logical chunk ID of the head from the list of the logical chunk IDs, and the process proceeds to Step S1702.

Figure 17B:
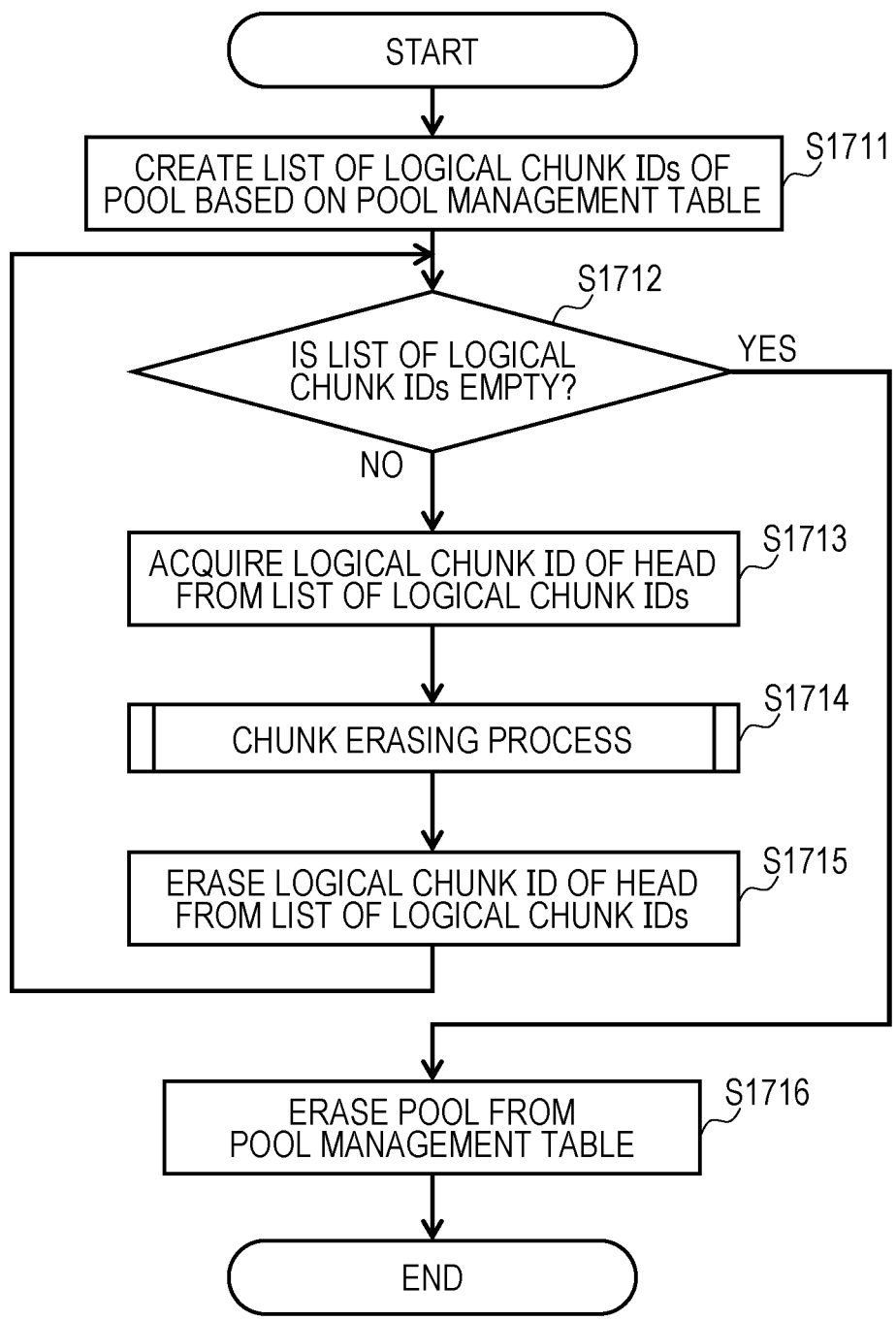
FIG. 17B is a flowchart illustrating an example of a pool erasing process according to the first embodiment.

FIG. 17B is a flowchart illustrating an example of the pool erasing process.

First, the IO control module 320 creates a list of logical chunk IDs of the pool (the corresponding pool) of the migration source on the basis of the pool management table 810 (Step S1711).

Subsequently, the IO control module 320 determines whether the list of the logical chunk IDs is empty (Step S1712). In a case where the IO control module 320 determines that the list is empty, the process proceeds to Step S1716. In a case where it is determined that the list is not empty, the process proceeds to Step S1713.

In Step S1713, the IO control module 320 acquires the logical chunk ID of the head from the list of the logical chunk IDs.

Subsequently, the IO control module 320 performs the chunk erasing process (Step S1714). In the chunk erasing process, the logical chunk (the erasing-target logical chunk) of the acquired logical chunk ID is erased. Further, the chunk erasing process will be described using FIG. 17C.

Subsequently, the IO control module 320 erases the logical chunk ID of the head from the list of the logical chunk IDs (Step S1715), and the process proceeds to Step S1712.

In Step S1716, the IO control module 320 erases the information of the pool from the pool management table 810, and ends the pool erasing process.

Figure 17C:
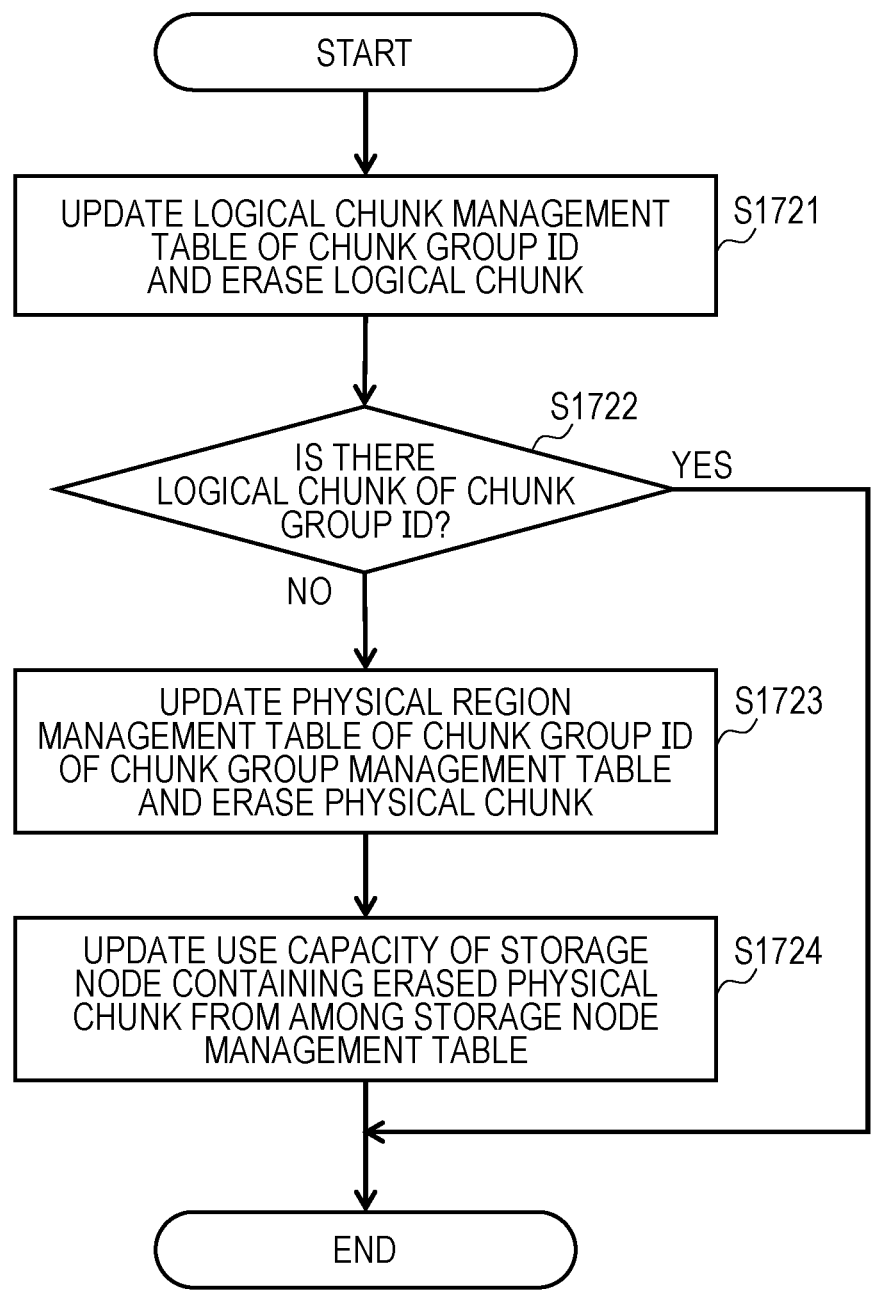
FIG. 17C is a flowchart illustrating an example of a chunk erasing process according to the first embodiment.

FIG. 17C is a flowchart illustrating an example of the chunk erasing process.

First, the IO control module 320 updates the logical chunk management table 600 of the chunk group ID (the corresponding chunk group ID) of the chunk group to which the logical chunk belonging to the pool of the migration source is allocated, and erases the information of the erasing-target logical chunk (Step S1721).

Subsequently, the IO control module 320 determines whether there is a logical chunk of the chunk group ID (Step S1722). In a case where the IO control module 320 determines that there is a logical chunk of the chunk group ID, the chunk erasing process ends. In a case where it is determined that there is no logical chunk of the chunk group ID, the process proceeds to Step S1723.

In Step S1723, since the logical chunk is excluded from the logical chunk management table 600 of the chunk group ID, the IO control module 320 updates the physical region management table 520 of the chunk group ID of the chunk group management table group 350, erases the information of the physical chunk, updates the chunk group management table 510, and erases the information of the chunk group.

Subsequently, the IO control module 320 updates the use capacity of the storage node 120 which includes the physical chunk of which the information is erased in the storage node management table 340 (Step S1724), and ends the chunk erasing process. Further, the IO control module 320 decreases the use capacity by the capacity of the physical chunk. According to this process, the use capacity of the storage node 120 is updated as the data migration is progressed, so that the capacity required for securing the data migration can be lowered.

Figure 18:
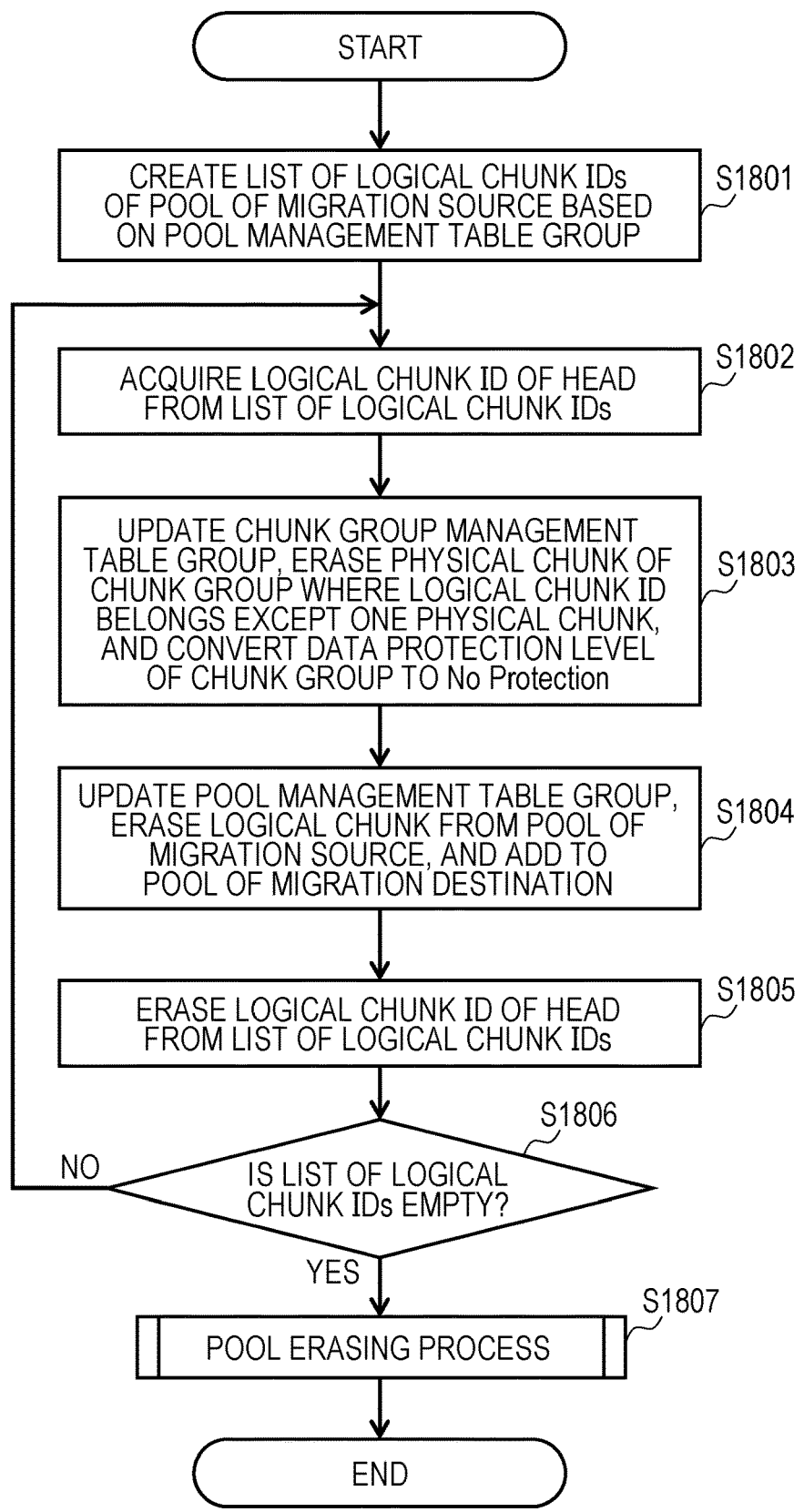
FIG. 18 is a flowchart illustrating an example of the data protection level conversion process of copy unnecessary according to the first embodiment.

FIG. 18 is a flowchart illustrating an example of the data protection level conversion process of copy unnecessary.

First, the IO control module 320 creates a list of the logical chunk IDs of the pool of the migration source on the basis of the pool management table group 370 (Step S1801).

In Step S1802, the IO control module 320 acquires the logical chunk ID of the head from the list of the logical chunk IDs.

Subsequently, the IO control module 320 updates the chunk group management table group 350, erases the physical chunks of the chunk group to which the acquired logical chunk ID (the corresponding logical chunk ID) belongs while leaving one physical chunk, and changes the data protection level of the chunk group to No Protection (Step S1803).

Subsequently, the IO control module 320 updates the pool management table group 370, erases the logical chunk (the corresponding logical chunk) belonging to the pool of the migration source from the pool of the migration source, and adds the logical chunk to the pool of the migration destination (Step S1804).

Subsequently, the IO control module 320 erases the logical chunk ID of the head of the list of the logical chunk IDs (Step S1805).

Subsequently, the IO control module 320 determines whether the list of the logical chunk IDs is empty (Step S1806). In a case where the IO control module 320 determines that the list is empty, the process proceeds to Step S1807. In a case where it is determined that the list is not empty, the process proceeds to Step S1802.

In Step S1807, the IO control module 320 performs a pool erasing process illustrated in FIG. 17B, and ends the data protection level conversion process of copy unnecessary.

In this embodiment, the storage node 120 required for the configuration of the data protection level after conversion is selected, and a command is issued to all the selected storage nodes 120 to protect data at the data protection level after conversion. Therefore, the conversion of the data protection level can be performed over the plurality of storage nodes 120.

(2) Second Embodiment

This embodiment is mainly different from the first embodiment in that, when a pool of a different data protection level is set in a different storage node, the volume is migrated over the storage nodes to covert the data protection level. Hereinafter, the description will be focused on configurations different from the first embodiment. Further, the same configurations as the first embodiment will be attached with the same symbol, and the descriptions thereof will be appropriately omitted.

Figure 19:
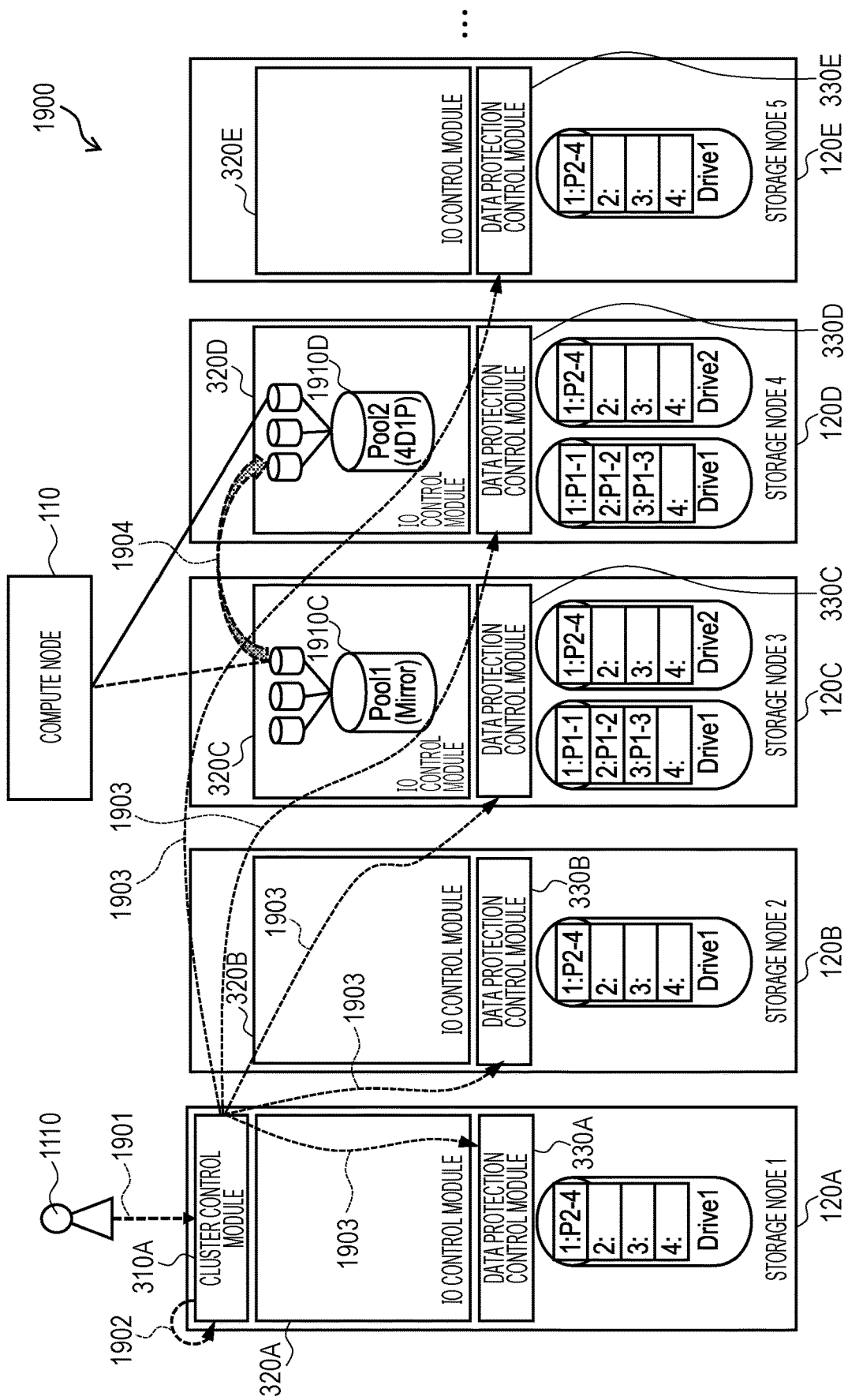
FIG. 19 is an image diagram of a conversion of the data protection level according to a second embodiment.

FIG. 19 is an image diagram of the conversion of the data protection level.

A storage system 1900 is configured to include the compute node 110, the storage node 120, and the management node 1110.

In the storage system 1900, one type of data protection level is set in each storage node 120. For example, Mirror is associated as a data protection level at a storage node 120C. 4D1P is associated as a data protection level at a storage node 120D. In other words, in the storage system 1900, there may be plural storage nodes 120 to which the same data protection level is set.

In addition, FIG. 19 illustrates an example where a pool 1910C is provided at the storage node 120C, and a pool 1910D is provided at the storage node 120D, but the invention is not limited thereto. The pool may be provided in all the storage nodes 120, and a plurality of pools may be provided in the storage node 120.

(Procedure 1901: Designation of Conversion of Data Protection Level)

The management node 1110 operated by the administrator issues, to a cluster control module 310A, a convert command (an example of request) which includes the information related to the data protection level (in this example, the information indicating that the pool 1910C is selected as a unit of conversion of the data protection level, and the information indicating that the data protection level is converted into 4D1P).

(Procedure 1902: Selection of Storage Node 120)

The cluster control module 310A selects the number of storage nodes required for setting the data protection level after conversion (for example, in the case of mDnP, m+n or more) from the storage cluster 130 or the protection on the basis of the convert command.

(Procedure 1903: Generation of Chunk Group)

The cluster control module 310A issues a command to the data protection control module 330 of each selected storage node 120 such that the chunk group of the data protection level after conversion is generated and combined. In addition, the cluster control module 310A issues a command to an IO control module 320C and the IO control module 320D such that data is migrated from the pool of the migration source to the pool of the migration destination.

(Procedure 1904: Migration of Data)

The IO control module 320D creates the pool 1910D corresponding to the data protection level after conversion. The IO control module 320C and the IO control module 320D migrate a volume from the pool 1910C to the pool 1910D.

In the above configuration, the data protection level can be converted over the plurality of storage nodes 120 even in a case where a pool of a different data protection level is set at a different storage node.

(3) Third Embodiment

This embodiment is different from the first embodiment in that, when a different data protection level is set at each protection domain, the volume is migrated over the protection domains to convert the data protection level. Hereinafter, the description will be focused on configurations different from the first embodiment. Further, the same configurations as the first embodiment will be attached with the same symbol, and the descriptions thereof will be appropriately omitted.

Figure 20:
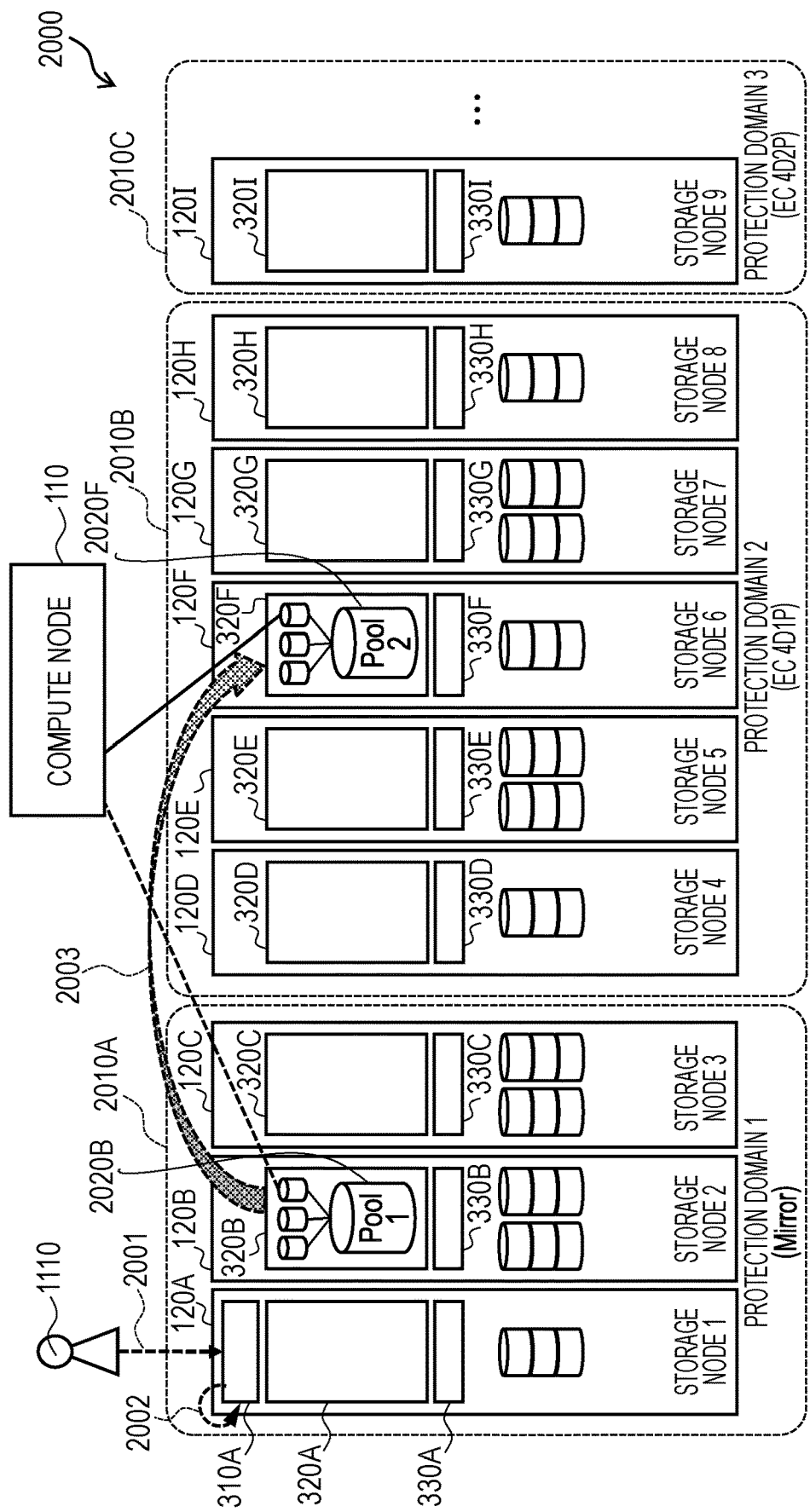
FIG. 20 is an image diagram of a conversion of the data protection level according to a third embodiment.

FIG. 20 is an image diagram of the conversion of the data protection level.

A storage system 2000 is configured to include the compute node 110, the storage node 120, and the management node 1110.

In the storage system 2000, a plurality of protection domains 2010 are defined, and a different data protection level is set in each protection domain. Further, FIG. 20 illustrates a first protection domain 2010A, a second protection domain 2010B, and the third protection domain 2010C.

In the first protection domain 2010A, Mirror is set as a data protection level. In the second protection domain 2010B, 4D1P is set as a data protection level. In a third protection domain 2010C, 4D2P is set as a data protection level.

Further, FIG. 20 illustrates an example in which a pool 2020B is provided at a storage node 120B, and a pool 2020F is provided at a storage node 120F, but the invention is not limited thereto. The pool may be provided in all the storage nodes 120, and a plurality of pools may be provided in the storage node 120.

(Procedure 2001: Designation of Conversion of Data Protection Level)

The management node 1110 operated by the administrator issues, to a cluster control module 310A, a convert command which includes the information related to the data protection level (in this example, the information indicating that the pool 2020B is selected as a unit of conversion of the data protection level, and the information indicating that the data protection level is converted into 4D1P).

(Procedure 2002: Selection of Protection Domain 2010)

The cluster control module 310A selects the protection domain 2010B providing the data protection level after conversion from the storage cluster 130 on the basis of the convert command. Further, the cluster control module 310A may select the number of storage nodes required for setting the data protection level after conversion (for example, in the case of mDnP, m+n or more) from the storage cluster 130 or the protection domain 2010 on the basis of the convert command.

In addition, the cluster control module 310A issues a command to an IO control module 320B and the IO control module 320F such that data is migrated from the pool of the migration source to the pool of the migration destination. Further, the cluster control module 310A is not limited to the configuration where the predetermined pool 2020F is used, but the pool may be created newly. For example, the cluster control module 310A may select the storage node 120 at which the CPU load is lowest among the storage nodes 120 belonging to the selected protection domain 2010B. In this case, the IO control module 320 of the selected storage node 120 creates a pool corresponding to the data protection level after conversion.

(Procedure 2003: Migration of Data)

The IO control module 320B and the IO control module 320F migrate a volume from the pool 2020B to the pool 2020F.

In the above configuration, the data protection level is set for each protection domain. Therefore, the physical chunk related to a different data protection level is not mixed to one storage node 120, and it is possible to protect data more appropriately.

(4) Other Embodiments

Further, the above embodiments have been described about a case where the invention is applied to the storage system, but the invention is not limited thereto. The invention may be widely applied to various types of systems, devices, methods, and programs.

In addition, in the above embodiments, the cluster control module 310, the IO control module 320, the data protection control module 330 have been described to be processed separately, but the invention is not limited thereto. The processes of the cluster control module 310, the IO control module 320, and the data protection control module 330 may be performed by any control module. Further, the respective control modules may be included in a hypervisor and operate therein, or may operate thereon.

In addition, in the above embodiments, various types of data have been described using an XX table for the convenience of explanation, but the data structure is not limited thereto and may be expressed using XX information. Further, the configuration of each table is given as merely exemplary. One table may be divided into two or more tables, all or some of the two or more tables may be formed to be one table.

In addition, in the above description, the information of the program realizing functions, tables, and files may be secured in a memory device such as a memory, a hard disk, a Solid State Drive (SSD) or a recording medium such as an IC card, an SD card, and a DVD.

In addition, various changes, replacements, combinations, or omissions may be made in the above configuration within a scope not departing from the spirit of the invention.

In addition, the above configuration includes the following features for example.

(First Feature)

A storage system (the storage system 100, the storage system 1900, the storage system 2000, etc.) which is configured to include a plurality of storage nodes (for example, the storage nodes 120) includes a selection unit (for example, the cluster control module 310, and the IO control module 320) which selects a storage node (in the case of Mirror setting, two storage nodes 120 which includes a capacity required for migrating data; in the case of 4D1P setting, five storage nodes 120 which includes a capacity required for migrating data; etc.) required for setting a data protection level after conversion from among the plurality of storage nodes on the basis of information (for example, the convert command) related to the conversion of the data protection level. The storage node (for example, the data protection control module 330) selected by the selection unit manages data using the data protection level after conversion.

In this configuration, the storage node required for setting the data protection level after conversion is selected, and the data is managed at the data protection level after conversion at the selected storage node. For example, the conversion of the data protection level can be realized over the plurality of storage nodes.

(Second Feature)

The plurality of storage nodes belongs to a predetermined storage cluster which includes a plurality of subsets (for example, the protection domain). The selection unit selects a storage node from among the subsets to which the storage node at which data designated to be converted in the data protection level is handled belong.

In this configuration, for example, the administrator is configured to easily grasp a range of dispersing data at the data protection level after conversion.

(Third Feature)

The selection unit selects a storage node in an order of the storage nodes having a large free capacity.

In this configuration, for example, the use capacity of the storage node can be even.

(Fourth Feature)

A predetermined storage node includes a control module (for example, the IO control module 320) which migrates data of a storage pool of which a data protection level is set. There are provided a first storage pool (for example, the pool 1120C, the pool 1910C, and the pool 2020B) in which a first data protection level is set, and a second storage pool (for example, the pool 1130C, the pool 1910D, and the pool 2020F) in which a second data protection level is set. In a case where a request for converting the data protection level is a request for converting the first data protection level into the second data protection level, the control module migrates data from the first storage pool to the second storage pool.

In this configuration, the data is migrated, for example, from the first storage pool to the second storage pool, so that the data at the data protection level before conversion is converted into the data at the data protection level after conversion.

(Fifth Feature)

The first storage pool is allocated with a plurality of physical capacities (for example, the physical chunk, and the logical chunk). The control module copies data from the first storage pool to the second storage pool to erase the data in order to, when data is migrated from the first storage pool to the second storage pool, exclude a physical capacity allocated from the first storage pool according to a capacity of the data migrated from the first storage pool to the second storage pool.

In this configuration, for example, the excluded physical capacity can be used even during the conversion of the data protection level.

(Sixth Feature)

A first storage node and a second storage node are included in the predetermined storage node. A process in which the control module of the first storage node migrates data from the first storage pool to the second storage pool, and a process in which the control module of the second storage node migrates data from the first storage pool to the second storage pool are performed in parallel.

In this configuration, for example, the process of migrating the data of the first storage node and the process of migrating the data of the second storage node are performed in parallel. Therefore, it is possible to shorten a processing time taken for migrating the data in the conversion of the data protection level.

(Seventh Feature)

The first storage pool is allocated with a physical capacity. The control module determines whether data at the data protection level before conversion and data at the data protection level after conversion are matched on the basis of a request (for example, the convert command) for converting the data protection level. In a case where the data is matched, management information (for example, the pool management table group 370) in which the storage pool and the physical capacity are associated is changed to allocate the physical capacity of the first storage pool to the second storage pool so as to migrate data from the first storage pool to the second storage pool.

In this configuration, for example, in a case where the data of the data protection level before conversion is matched to the data of the data protection level after conversion, there is no need to copy the data from the first storage pool to the second storage pool, so that it is possible to shorten a processing time taken for migrating the data in the conversion of the data protection level.

(Eighth Feature)

Information related to the conversion of the data protection level includes information indicating that the entire storage system, a subset of a storage cluster, a storage pool, or a volume as a unit of the conversion of the data protection level.

In this configuration, for example, a unit of conversion of the data protection level can be designated, so that the conversion of the data protection level can be appropriately performed over the plurality of storage nodes.

According to this configuration, it is possible to realize a storage system which can flexibly change the data protection level on the basis of a condition such as capacity efficiency and reliability.

What is claimed is:

1. A storage system which is configured to include a plurality of storage nodes, comprising:
   a selection unit which selects a storage node required for setting a data protection level after conversion from among the plurality of storage nodes on the basis of information related to a conversion of the data protection level,
   wherein the storage node selected by the selection unit manages data using the data protection level after conversion;
   wherein a predetermined storage node includes a control module which migrates data of a storage pool of which a data protection level is set, wherein a first storage node and a second storage node are included in the predetermined storage node, and
   a process in which a control module of the first storage node migrates data from the first storage pool to the second storage pool, and a process in which a control module of the second storage node migrates data from the first storage pool to the second storage pool are performed in parallel.

2. The storage system according to claim 1, wherein
   the plurality of storage nodes belongs to a predetermined storage cluster which includes a plurality of subsets, and
   the selection unit selects a storage node from among the subsets to which the storage node at which data designated to be converted in the data protection level is handled belongs.

3. The storage system according to claim 1,
   wherein the selection unit selects a storage node in an order of the storage nodes having a large free capacity.

4. The storage system according to claim 1, wherein
a predetermined storage node includes a control module which migrates data of a storage pool of which a data protection level is set,
a first storage pool in which a first data protection level is set is provided, and a second storage pool in which a second data protection level is set is provided, and
in a case where a request for converting the data protection level is a request for converting the first data protection level into the second data protection level, the control module migrates data from the first storage pool to the second storage pool.

5. The storage system according to claim 4, wherein
the first storage pool is allocated with a plurality of physical capacities, and
the control module copies data from the first storage pool to the second storage pool to erase the data in order to, when data is migrated from the first storage pool to the second storage pool, exclude a physical capacity allocated from the first storage pool according to a capacity of the data migrated from the first storage pool to the second storage pool.

6. The storage system according to claim 4, wherein
the first storage pool is allocated with a physical capacity,
the control module determines whether data at the data protection level before conversion and data at the data protection level after conversion are matched on the basis of a request for converting the data protection level, and
in a case where the data is matched, management information in which the storage pool and the physical capacity are associated is changed to allocate the physical capacity of the first storage pool to the second storage pool so as to migrate data from the first storage pool to the second storage pool.

7. The storage system according to claim 1,
wherein information related to the conversion of the data protection level includes information indicating the entire storage system, a subset of a storage cluster, a storage pool, or a volume is a unit of conversion.

* * * * *